US008639735B2

(12) United States Patent
Benjelloun Touimi

(10) Patent No.: US 8,639,735 B2
(45) Date of Patent: Jan. 28, 2014

(54) DATA PROCESSING METHOD BY PASSAGE BETWEEN DIFFERENT SUB-BAND DOMAINS

(75) Inventor: Abdellatif Benjelloun Touimi, Lannion (FR)

(73) Assignee: France Telecom, Paris (FR)

( * ) Notice: Subject to any disclaimer, the term of this patent is extended or adjusted under 35 U.S.C. 154(b) by 1366 days.

(21) Appl. No.: 11/662,980

(22) PCT Filed: Aug. 23, 2005

(86) PCT No.: PCT/FR2005/002127

§ 371 (c)(1), (2), (4) Date: Mar. 18, 2008

(87) PCT Pub. No.: WO2006/032740

PCT Pub. Date: Mar. 30, 2006

(65) Prior Publication Data

US 2009/0198753 A1 Aug. 6, 2009

(30) Foreign Application Priority Data

Sep. 16, 2004 (FR) ..................................... 04 09820

(51) Int. Cl.
*G06F 7/00* (2006.01)

(52) U.S. Cl.
USPC .......................................................... 708/203

(58) Field of Classification Search
None
See application file for complete search history.

(56) References Cited

U.S. PATENT DOCUMENTS

| | | | | |
|---|---|---|---|---|
| 5,610,942 | A * | 3/1997 | Chen et al. | 375/242 |
| 6,134,523 | A | 10/2000 | Nakajima et al. | |
| 6,947,509 | B1 * | 9/2005 | Wong | 375/350 |
| 2003/0014241 | A1 | 1/2003 | Ferris et al. | |
| 2003/0093282 | A1 | 5/2003 | Goodwin | |
| 2003/0149559 | A1 | 8/2003 | Lopez-Estrada | |
| 2004/0102966 | A1 | 5/2004 | Sung et al. | |
| 2005/0018796 | A1 * | 1/2005 | Sande et al. | 375/350 |
| 2009/0307294 | A1 * | 12/2009 | Picard et al. | 708/300 |
| 2011/0004478 | A1 * | 1/2011 | Jax et al. | 704/500 |

OTHER PUBLICATIONS

H.S. Malvar, "Signal Processing with Lapped Transforms", Artech House, Inc., 1992. (Full Text enclosed).
P.P. Vaidyanathan, "Multirate Systems and Filter Banks", Prentice Hall, 1993, pp. 148-151, 259-266, section 10.1.
A.N. Skodras, "Direct Transform to Transform Computation", IEEE Signal Processing Letters, vol. 6, No. 8, Aug. 1999, pp. 202-204.

(Continued)

*Primary Examiner* — David H Malzahn
(74) *Attorney, Agent, or Firm* — Knobbe Martens Olson & Bear LLP

(57) ABSTRACT

The invention concerns data processing by passage between different subband domains, of a first number L to a second number M of subband components. After determining a third number K, least common multiple between the first number L and the second number M: a) if K is different from L, it consists in arranging in blocs, by a serial/parallel conversion, an input vector X(z) to, obtain $p_2$ polyphase component vectors (p2=KL); b) applying a square matrix filtering T(z) of dimensions K×K, to the $p_2$ polyphase component vectors to obtain $p_1$ polyphase component vectors for forming an output vector Y(z), with $p_1$=K/M, and if the third number K is different from the second number M, providing a block arrangement by a parallel/serial conversion to obtain the output vector Y(z).

27 Claims, 16 Drawing Sheets

(56) References Cited

OTHER PUBLICATIONS

J.B. Lee et al., "2-D Transform-Domain Resolution Translation", IEEE Trans. on Circuit and Systems for Video Technology, vol. 10, No. 5, Aug. 2000, pp. 704-714.

A. Benjelloun Touimi, these de doctorat de l'école nationale supérieure des telecommunications de Paris, May 2001, "Traitment du signal audio dans le domaine codé: techniques et applications"; Front matter; pp. i-xx and pp. 1-159 (183 total pages).

Abdellatif Benjelloun Touimi, "Manipulation et conversion de formats audio codé: un panorama", IRISA, Jun. 12, 2003, XP002326271.

Sande RK et al., "An efficient VLSI/FPGA architecture for combining an analysis filterbank following a synthesis filterbank", IEEE US vol. III, May 23, 2004, pp. 517-520, XP010719329.

* cited by examiner

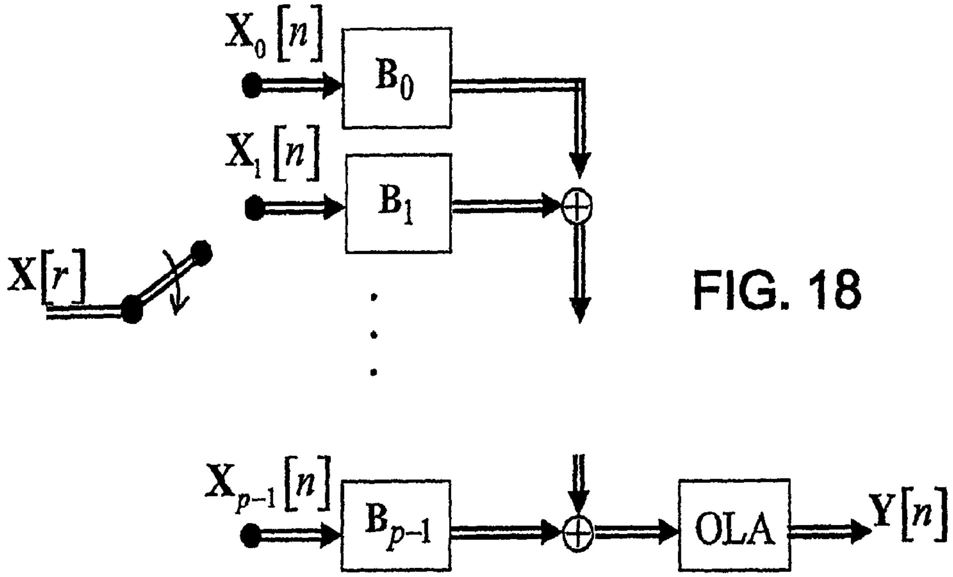
FIG. 18
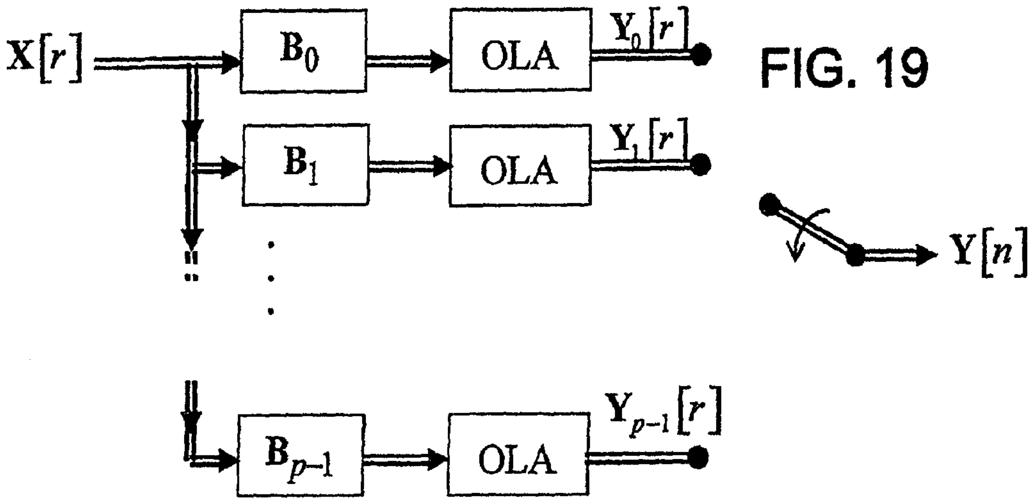
FIG. 19
FIG. 20a
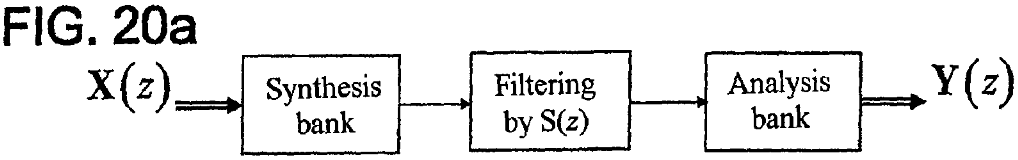
FIG. 20b
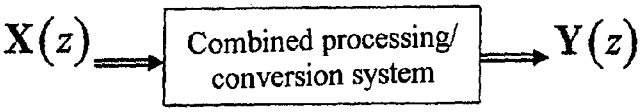

FIG. 21a
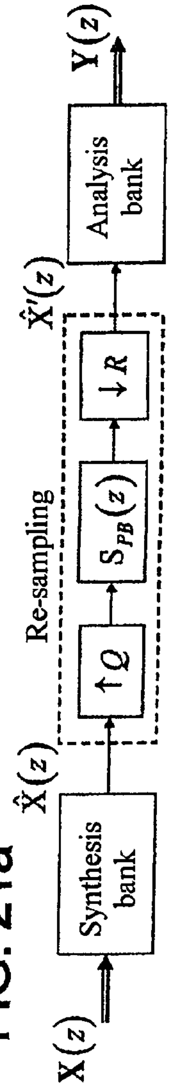
FIG. 21b
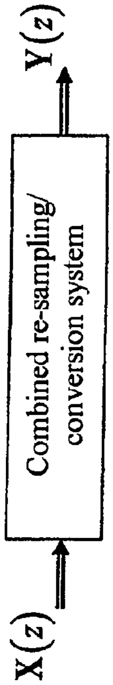
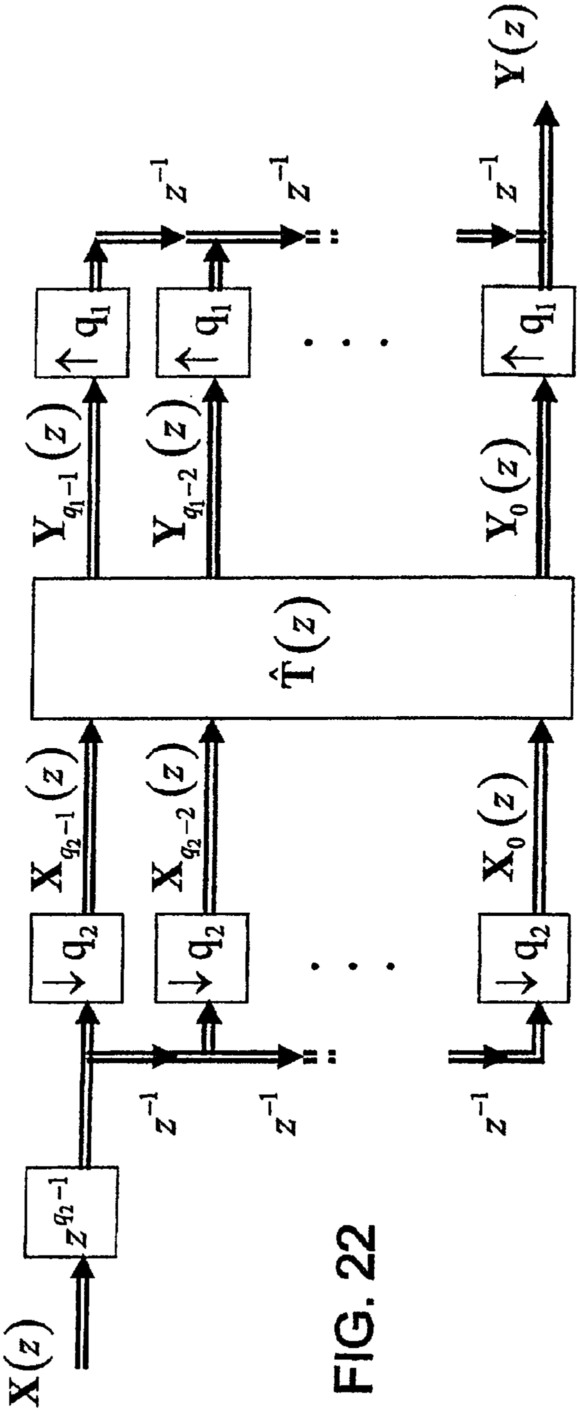
FIG. 22

| | | MPEG-1/2 LI&II $M=32$, $N_1=512$ | MPEG-2/4 AAC Fenêtre courte $M=128$, $N_1=256$ | MPEG-2/4 AAC Fenêtre longue $M=1024$, $N_1=2048$ | Dolby AC-3 Fenêtre courte $M=128$, $N_1=256$ | Dolby AC-3 Fenêtre longue $M=256$, $N_1=512$ | G.722.1 / TDAC $M=320$, $N_1=640$ |
|---|---|---|---|---|---|---|---|
| MPEG-1/2 LI&II | | | $K=128$, $p=4$, $N=7$, $r_0=126$ | $K=1024$, $p=32$, $N=4$, $r_0=510$ | $K=128$, $p=4$, $N=7$, $r_0=126$ | $K=256$, $p=8$, $N=5$, $r_0=254$ | $K=320$, $p=10$, $N=5$, $r_0=190$ |
| MPEG-2/4 AAC | F.C. | $K=128$, $p=4$, $N=7$, $r_0=126$ | | | $K=1$, $p=1$ | $K=256$, $p=2$, $N=4$, $r_0=254$ | $K=640$, $p_1=2$, $p_2=5$, $N=3$, $r_0=254$ |
| | F.L. | $K=1024$, $p=32$, $N=4$, $r_0=510$ | | | $K=1024$, $p=8$, $N=4$, $r_0=254$ | $K=1024$, $p=4$, $N=4$, $r_0=510$ | $K=5120$, $p_1=16$, $p_2=5$, $N=2$, $r_0=2686$ |
| Dolby AC-3 | F.C. | $K=128$, $p=4$, $N=7$, $r_0=126$ | $K=1$, $p=1$ | $K=1024$, $p=32$, $N=4$, $r_0=254$ | | | |
| | F.L. | $K=256$, $p=8$, $N=5$, $r_0=254$ | $K=256$, $p=2$, $N=4$, $r_0=254$ | $K=1024$, $p=4$, $N=4$, $r_0=510$ | | | |
| G.722.1 / TDAC | | $K=320$, $p=10$, $N=5$, $r_0=190$ | $K=640$, $p_1=5$, $p_2=2$, $N=3$, $r_0=254$ | $K=5120$, $p_1=5$, $p_2=16$, $N=2$, $r_0=2686$ | | | |

FIG. 27

DATA PROCESSING METHOD BY PASSAGE BETWEEN DIFFERENT SUB-BAND DOMAINS

This application claims priority from PCT/FR2005/02127 filed Aug. 23, 2005, which claims priority from French Application FR 04 09820, filed Aug. 16, 2004, both of which are hereby incorporated by reference in their entirety.

BACKGROUND OF THE INVENTION

The present invention relates to the processing of data by switching between different sub-band domains, in particular, but not in any way exclusively, for the transcoding between two types of compression coding/decoding.

Recent developments in digital coding formats for multimedia signals today allow significant compression rates. Furthermore, the increase in the capacities of transport and access networks is now ensuring everyday use by the public at large of digital multimedia contents (speech, audio, image, video and the like). The consumption of this content is done on various types of terminals (computers, mobile terminals, personal assistants (PDA), television decoder terminals ("Set-Top-Box") or the like) and via various types of network (IP, ADSL, DVB, UMTS, or the like). This access to multimedia content by the user must be done in a transparent manner on these various terminals and across these various networks. One then speaks of "universal access to multimedia content" or "UMA" standing for "Universal Multimedia Access", a diagrammatic illustration of which is represented in FIG. 1.

One of the main problems due to the heterogeneity of terminals relates to the diversity of the coding formats that they are capable of interpreting. One possible solution would be to recover the capacities of the terminal before delivering the content in a compatible format. This solution may turn out to be more or less effective according to the scenario of delivery of the multimedia content considered (downloading, streaming or broadcasting). It becomes inapplicable in certain cases, such as for broadcasting or for streaming in multicast mode. The concept of transcoding (or of changing coding format) therefore turns out to be important. This operation may intervene at various levels of the transmission chain. It may intervene at the server level for changing the format of the content previously stored for example in a database, or else intervene in a gateway in the network, or the like.

A direct and customary method of transcoding consists in decoding the content and in recoding it to obtain a representation in the new coding format. This method generally has the drawbacks of using significant computational power, of increasing the algorithmic delay due to the processing and sometimes of adding a supplementary degradation of the perceptual quality of the multimedia signal. These parameters are very significant in multimedia applications. Their improvement (reduction in complexity and in delay and maintaining of quality) is a significant factor for the success of these applications. This factor sometimes becomes an essential condition of implementation.

With the aim of improving these parameters, the principle of so-called "intelligent" transcoding has come into being. This type of transcoding consists in performing a partial decoding, the most minimal possible, of the initial coding format to extract the parameters allowing the reconstruction of the new coding format. The success of this method is therefore measured by its capacity to reduce algorithmic complexity and algorithmic delay and of maintaining, or even increasing, perceptual quality.

In image and video coding, much work on transcoding has been carried out. We cite for example the changing of image size from CIF to QCIF, or else MPEG-2 to MPEG-4 formats. For the transcoding of speech signals, typically in telephony, work is under way for solving problems related to the coding formats. On the other hand, very little or almost no work has tackled the processing of audio signals. The existing work remains restricted to cases of reducing bit rate within one and the same format or when switching between certain coding formats of very similar structures. The main reason lies in the fact that the most widely used audio coders are of transform (or sub-band) type and, generally, these coders use transforms or filter banks that differ. Thus, it will be understood that the embodying of a system for converting between the representations of the signal in the domains of these transforms or filter banks is therefore the first difficulty to be overcome before being able to attack any other problem related to intelligent transcoding in the field of audio.

Given below is a definition of audio transcoding and the principal problems which arise, after a brief reminder of the principles of perceptual audio sub-band coding.

There exists a great diversity of audio coders which have been designed for various types of applications and for a wide range of bit rates and qualities. These coders may be specific to the constructor (or "proprietary"), or else standardized by decisions of international bodies. Additionally, they all possess a common basic structure and rely on like principles.

The basic principle of perceptual frequency audio coding consists in reducing the bit rate of information by utilizing the properties of the hearing system of the human being. The nonrelevant components of the audio signal are eliminated. This operation uses the phenomenon of so-called "masking". As the description of this masking effect is done principally in the frequency domain, the representation of the signal is carried out in the frequency domain.

More specifically, the basic schemes of a coding and decoding system are presented in FIGS. 2*a* and 2*b*. With reference to FIG. 2*a*, the digital audio input signal Se is firstly decomposed by a bank of analysis filters 20. The resulting spectral components are thereafter quantized and then coded by the module 22. The quantization uses the result of a perceptual model 24 so that the noise which stems from the processing is inaudible. Finally, a multiplexing of the various coded parameters is performed by the module 26 and an audio frame Sc is thus constructed.

With reference to FIG. 2*b*, the decoding is carried out in a dual manner. After demultiplexing of the audio frame by the module 21, the various parameters are decoded and the spectral components of the signal are dequantized by the module 23.

Finally, the temporal audio signal is reconstituted by the bank of synthesis filters 25.

The first stage of any perceptual audio coding system therefore consists of a bank of analysis filters 20, used for the time/frequency transformation. A wide, variety of filter banks and transforms have been developed and utilized in audio coders. Mention may be made by way of example of pseudo-QMF filter banks, hybrid filter banks, MDCT transform banks. The MDCT transform is currently turning out to be the most effective in this context. It is the basis of the most recent and efficacious audio coding algorithms such as those used for the MPEG-4 AAC, TwinVQ and BSAC, Dolby AC-3 standard, in the TDAC coder/decoder (standing for "Time Domain Aliasing Cancellation") from France Telecom, in UIT-T standard G.722.1.

Although these various transformations have been developed separately, they may be described by a similar general mathematical approach and from various points of view: modulated cosine filter banks, lapped orthogonal transforms (or "LOT") and more generally for filter banks with maximal decimation, that is to say with critical sampling. It is recalled that the property of critical sampling for a filter bank consists in the subsampling/oversampling factor being equal to the number of sub-bands.

FIGS. 3*a* and 3*b* respectively illustrate the conventional transcoding and intelligent transcoding schemes in a communication chain, between a coder CO1 according to a first coding format and a decoder DEC2 according to a second coding format. In the case of conventional transcoding, a complete decoding operation is performed by the decoder module DEC1 according to the first format (FIG. 3*a*), followed by a recoding by the coder module CO2 according to the second format, so as ultimately to end up in the second coding format.

In the case of FIG. 3*b*, the two blocks DEC1 and CO2 of FIG. 3*a* are on the other hand replaced with an integrated module 31 that is called an "intelligent" transcoding module.

Represented in FIG. 4 are the details of the operations that are merged by the implementation of intelligent transcoding. This principally involves integrating the functional blocks of the synthesis filter banks BS1 and of the analysis filter banks BA2 of the conventional transcoding so as to culminate in a system for direct conversion between sub-band domains, in the module 31.

The use by the coders of various types of filter banks (of different sizes, in particular in terms of number of sub-bands, and of different structures) is the first and principal problem to be overcome. This therefore involves transposing the whole set of samples of a frame from the domain of an initial filter bank to that of a destination filter bank. This transposition is the first operation to be done in any intelligent audio transcoding system.

Table 1 below gives a summary regarding the types of filter banks used in the best known transform-based audio coders, as well as their characteristics. As may be noted, in addition to the MDCT transform which is the one most widely used, there are the pseudo-QMF banks. Additionally, they all form part of the family of maximal decimation and modulated cosine banks that exactly or almost satisfy the property of perfect reconstruction.

TABLE 1

The filter banks most widely used in audio coding and their characteristics.

| Coder | Filter bank | Characteristics |
|---|---|---|
| MPEG-1 Layer I & II | Pseudo-QMF | Number of bands M = 32 |
| MPEG-1 Layer III | Pseudo-QMF/MDCT (hybrid) | 32 bands followed by an MDCT of size 18 for each |
| MPEG-2/4 AAC | MDCT | M = 1024 bands for the long window and M = 128 for the short window. KBD (Kaise-Bessel Derived) window with α = 4 for the stationary states and α = 6 for the transitions. |
| MPEG-4 BSAC | MDCT | M = 1024 bands for the long, window and M = 128 bands for the short window. |
| MPEG-4 TwinVQ | MDCT | M = 1024 bands for the long window and M = 128 bands for the short window. Possibility of using a KBD window or a sinusoidal window. |

TABLE 1-continued

The filter banks most widely used in audio coding and their characteristics.

| Coder | Filter bank | Characteristics |
|---|---|---|
| Dolby AC-3 | MDCT | M = 256 bands for the long window and M = 128 for the short window KBD window with α = 5 |
| FTR&D TDAC | MDCT | M = 320 bands Sinusoidal window |
| G.722 | QMF | Two sub-bands |
| G.722.1 | MDCT | M = 320 sub-bands Sinusoidal window |

It is indicated that the switch between the AAC and AC-3 formats is currently arousing much interest.

Table 2 below restates certain types of sub-band coding of table 1 while detailing a few of their applications.

TABLE 2

Examples of sub-band coders for audio signals and speech signals and a few examples of their principal applications.

| Coder | Applications | Remarks |
|---|---|---|
| MPEG-1/2 Layer I | Broadcasting | |
| MPEG- 1/2 Layer II | Broadcasting | Used in Europe for DAB broadcasting ("Digital Audio Broadcasting", ETSI ETS 300 401 standard). Used also for RF digital television broadcasting, in Europe (DVB standard) |
| MPEG-1 Layer III (MP3) | Downloading, streaming | |
| MPEG-2/4 AAC | Broadcasting, downloading, streaming | The MPEG-2 AAC audio coder (ISO/IEC13818-7) is specified as the only audio coder for broadcasting in Japan in ISDB services ("Integrated Service Digital Broadcasting") including: ISDB-T (terrestrial), ISDB-S (satellite), and ISDB-C (cable). DVB-IP uses, the MPEG-2 AAC coder |
| MPEG-4 BSAC | Broadcasting | This coder is used in Korea for digital television broadcasting |
| Dolby AC-3 | Broadcasting | Used in the USA for digital television broadcasting |
| Sony ATTRAC3 | | Used in Japan (on-line music channel of iTunes type). |
| France Telecom: TDAC | Teleconferencing | |
| UIT-T G.722 | Teleconferencing | |
| UIT-T G.722.1 | Teleconferencing, H.323 | Group communication systems (teleconferencing, audioconferencing) |

In the known prior art in audio transcoding, document U.S. Pat. No. 6,134,523 presents a process for reducing bit rate in the coded domain for audio signals coded by MPEG-1 Layer I or II. Even though this process is akin to audio transcoding processes, it does not carry out any change between coding formats and the signals of the sub-bands remain in the representation of one and the same transformed domain, namely the representation of the pseudo-QMF filter bank. Here, the signals are quite simply requantized according to a new allocation of bits.

Additionally, in document US-2003/0149559, is proposed a process for reducing the complexity of the psycho-acoustic model during a transcoding operation. Thus, so as not to have to resort to an operation for calculating masking thresholds during transcoding, the new system uses values stored in a database of distortion templates. Even though this process deals with the problems of transcoding, it remains far from the objectives relating to switching between filter bank domains.

In document US-2003/014241 is proposed a system for transcoding between the MPEG-1 Layer II and MPEG-1 Layer III audio coding formats. Specifically, the MPEG-1 Layer II format uses a pseudo-QMF analysis filter bank and the MPEG-1 Layer III format uses the same filter bank followed by an MDCT transform of size 18 applied to the output sub-band signals of said bank. One speaks of a "hybrid filter bank". The conversion system proposed in this document consists in applying this transform after inverse quantization of the samples of the sub-bands of an MPEG-1 Layer II frame. The system therefore profits from the similarity between the two coding formats.

With respect to the sought-after aim within the sense of the present invention, the following remarks may be noted:

This prior art technique can be applied only for this particular case of transcoding.

This technique does not truly process a conversion in a new, different, sub-band domain. It simply involves cascading a new missing analysis filter bank, which makes it possible to increase the frequency resolution.

Multirate processing and filtering in the transformed domain are already known in another context of image and/or video data processing, especially through the reference:

"2-*D Transform-Domain Resolution Translation*", J.-B. Lee and A. Eleftheriadis, *IEEE Trans. on Circuit and Systems for Video Technology*, Vol. 10, No. 5, August 2000.

It describes a generalization of a process of linear filtering in the transformed domain (TDF standing for "Transform-Domain Filtering"). More particularly, this generalization is established in the case where the first transform (inverse) $T_1$, and the second transform (direct) $T_2$, are of the same size. The generalization consists firstly in extending the process to the case where the transforms are not of the same size. This process is then termed "non-uniform TDF" (or NTDF). It is thereafter extended to the case where in addition to the filtering, multirate processing operations (subsampling and oversampling) are added in the transformed domain, this resulting in the "Multirate-TDF" (MTDF).

Proposed as an application is the changing of resolution in the transform domain (TDRT standing for "Transform-Domain Resolution Translation"), particularly for image and video applications (conversion between CIF and QCIF image formats) where the transform is a DCT (standing for "Discrete Cosine Transform"). This reference is therefore interested only in filtering in the transformed domain. The process set forth is restricted only to cases of transforms with no overlap such as a DCT, a DST, or the like, but could not typically be applied to transforms with overlap such as an MLT (standing for "Modulated Lapped Transform") and, more generally, to any type of filter bank with maximum decimation, these filters possibly having moreover a finite or infinite impulse response.

As regards the conversion between DCT domains of different sizes, still for the transcoding of images and video, the following reference may be cited: "*Direct Transform to Transform Computation*", A. N. Skodras, *IEEE Signal Processing Letters*, Vol. 6, No. 8, August 1999, pages: 202-204.

In this document is proposed a process for switching between DCT transforms of different sizes for an image sub-sampling in the DCT domain. One of the applications of this process would be transcoding. Additionally, this process is restricted to the construction of a transformed vector of size N from two adjacent transformed vectors each of size N/2.

A process for converting between the representations of the signal in the MDCT domain and the DFT domain (Discrete Fourier Transform) is presented in document US-2003/0093282.

It was developed with the objective of converting the audio signal into a representation where it can be easily modifiable. Specifically, the TDAC filter banks are more practical and are used more in audio coders, contrary to the DFT filter banks. Additionally, carrying out a processing or modifications on the components of the signal in this transformed domain is neither adequate nor sufficiently flexible in view of the existence of spectral aliasing components. On the other hand, the DFT representation is more useful when modifications are to be made on the audio signal such as a change of timescale or a shift of pitch. This reference therefore proposes a direct process for converting between MDCT and DFT domain instead of applying the conventional process consisting in synthesizing the temporal signal by an inverse MDCT, then applying the DFT. This process therefore allows modifications to be made directly in the coded domain. The document also proposes the dual process for converting between the DFT and MDCT domains, which would be useful in the case where there was a need to recode the audio signal after modification.

In this reference, the comparison in terms of complexity with a conventional conversion process shows no reduction. Additionally, a small gain in memory allowing storage of the data is demonstrated.

However,

The process set forth in this reference deals with a particular case. It is restricted solely to the case of converting between the MDCT and DFT domains and vice versa.

The process is restricted to the case where these two filter banks are of the same size.

The publication: "*An Efficient VLSI/FPGA Architecture for Combining an Analysis Filter Bank following a Synthesis Filter Bank*", Ravindra Sande, Anantharaman Balasubramanian, *IEEE International Symposium on Circuits and Systems*, Vancouver, British Columbia, Canada, May 23-26, 2004, can also be cited.

This publication discloses an efficient structure for implementing a system consisting of a synthesis filter bank, with L sub-bands, followed by an analysis filter bank with M sub-bands, where M and L are multiples of one another. This structure is efficient for implementation in VLSI integrated technology ("Very Large Scale Integration") or on FPGA ("Field Programmable Gate Array") or on parallel processors. It requires fewer logic blocks, low power consumption and makes it possible to extend the degree of parallelism. The process proposed is applicable in situations where one processing based on sub-bands follows another sub-band processing and where the intermediate synthesized signal is unnecessary.

However:

The process described above makes the restrictive assumption that the filter banks considered are modulated and may be decomposed into a polyphase structure.

The process is restricted solely to the particular cases where M and L are multiples of one another.

It should also be indicated that the structure of the scheme for converting between sub-band domains exhibits a certain similarity with that of the problem of trans-multiplexing presented in particular in:

"*Multirate Systems and Filter Banks*", P. P. Vaidyanathan, Prentice Hall, Englewood Cliffs, N.J., 1993, pp. 148-151.

Specifically, in trans-multiplexing from TDM to FDM (standing for "Time Domain Multiplexing" to "Frequency Domain Multiplexing"), a synthesis filter bank is used. To reconstruct the interlaced time signals (that is to say to perform the inverse trans-multiplexing operation from FDM to TDM), an analysis filter bank is used. The structure of the TDM→FDM→TDM system therefore amounts to a cascading of a synthesis filter bank and of an analysis filter bank, this corresponding well to what is also used in a conventional transcoding system. The problem generally posed in these trans-multiplexing systems is to reconstruct the original signals without distortions after the TDM→FDM→TDM operation. This principally involves eliminating the distortions due to the phenomenon of crosstalk which result from the use of non-perfect bandpass filters, in these filter banks. A judicious design of the synthesis and analysis filters, as indicated in the same reference:

"*Multirate Systems and Filter Banks*", P. P. Vaidyanathan, Prentice Hall, Englewood Cliffs, N.J., 1993, pages 259-266, makes it possible to overcome this problem. In the design proposal for these filters, a process is given for merging the synthesis and analysis filter banks, thereby amounting to proposing an intelligent conversion system.

However:

In the multiplexing structure proposed in this document, the synthesis and analysis filter banks have the same number of bands (M=L).

There is no aim to construct a trans-multiplexing system merging the synthesis and analysis filter banks exactly as in transcoding. These two filter banks are left cascaded, independently.

SUMMARY OF THE INVENTION

The present invention seeks to improve the situation with respect to the prior art presented above.

For this purpose it proposes a method implemented by computer resources to process data by switching between different sub-band domains, consisting in compacting in one and the same processing the application of a first vector comprising a first number L of respective sub-band components, to a bank of synthesis filters, then to a bank of analysis filters, to obtain a second vector comprising a second number of respective sub-band components M.

The method within the meaning of the invention comprises the following steps, after determination of a third number K, the least common multiple between the first number L and the second number M:

a) if the third number K is different from the first number L, arrangement blockwise by a serial/parallel conversion of the first vector to obtain $p_2$ polyphase component vectors, with $p_2$=K/L, b) application of a chosen matrix filtering, involving a square matrix T(z) of dimensions. K×K, to said $p_2$ polyphase component vectors to obtain $p_1$ polyphase component vectors of the second vector, with $p_1$=K/M, and c) if the third number K is different from the second number M, arrangement blockwise by a parallel/serial conversion to obtain said second vector.

Thus, the present invention proposes in particular, but not exclusively as will be seen below, a transcoding from any first type of coding, to any second type of coding. It will also be understood that the respective numbers of sub-bands M and L are any natural integers and are not necessarily related by a proportionality relation, in the most general case.

Thus, the method within the meaning of the invention may be applied advantageously to the transcoding of a first type of compression coding/decoding to at least one second type of compression coding/decoding. This application typically consists in compacting in one and the same processing the following steps:

recovering data at least partially decoded according to said first type, in the form of a first vector comprising a first number L of respective sub-band components, applying the first vector to a bank of synthesis filters according to the first type, then to a bank of analysis filters according to the second type, and recovering a second vector comprising a second number of respective sub-band components M and which can be applied to subsequent coding steps according to the second type.

The present invention is also aimed at a computer program product, intended to be stored in a memory of an item of equipment in a communication network, such as a server, a gateway, or else a terminal, and then comprising instructions for the implementation of all or part of the method as claimed in the invention.

The present invention is also aimed at an item of equipment such as a server, a gateway, or else a terminal, intended for a communication network, and comprising computer resources for the implementation of the method as claimed in the invention.

BRIEF DESCRIPTION OF THE DRAWINGS

Other characteristics and advantages of the invention will become apparent on examining the detailed description hereinbelow, and the appended drawings in which, in addition to:

FIG. 18 illustrates the conversion system within the meaning of the invention in an embodiment corresponding to a transform and an addition with overlap OLA for efficient implementation allowing processing on the fly, in the particular case M=pL, FIG. 19 illustrates the conversion system within the meaning of the invention in an embodiment corresponding to a transform and an addition with overlap OLA for efficient implementation allowing processing on the fly, in the particular case L=pM, FIGS. 20*a* and 20*b* respectively illustrate a filtering combined with a conversion between sub-band domains, and an equivalent global system, within the meaning of the invention, FIGS. 21*a* and 21*b* illustrate the combination of a change of sampling frequency (or "re-sampling") with a conversion between sub-band domains, conventional and within the meaning of the invention, respectively, FIG. 22 is a multirate blockwise representation of the system for conversion within the meaning of the invention between sub-band domains, combined with re-sampling, FIG. 27 is a table indicating the parameters of the conversion system within the meaning of the invention for particular cases of coding formats.

DESCRIPTION OF PREFERRED EMBODIMENTS

The method of converting between sub-band domains, is described below in a general presentation of the invention.

We consider the L-band synthesis bank used by a first compression coding system and defined by its filters, denoted $F_k(z)$, $0 \le k \le L-1$, as well as the M-band analysis filter bank used in a second compression system and defined by its filters, denoted $H_n(z)$, $0 \le n \le M-1$. The two filter banks used in the two compression systems are assumed to be preferentially maximal decimation systems (or "critical sampling systems"), as will be seen later.

We denote by $X(z)=[X_0(z)X_1(z) \ldots X_{L-1}(z)]^T$ and $Y(z)=[Y_0(z)Y_1(z) \ldots Y_{M-1}(z)]^T$, the vectors of the signals of the sub-bands representing the signal respectively in the domains of the first and second filter banks.

Figure 1:
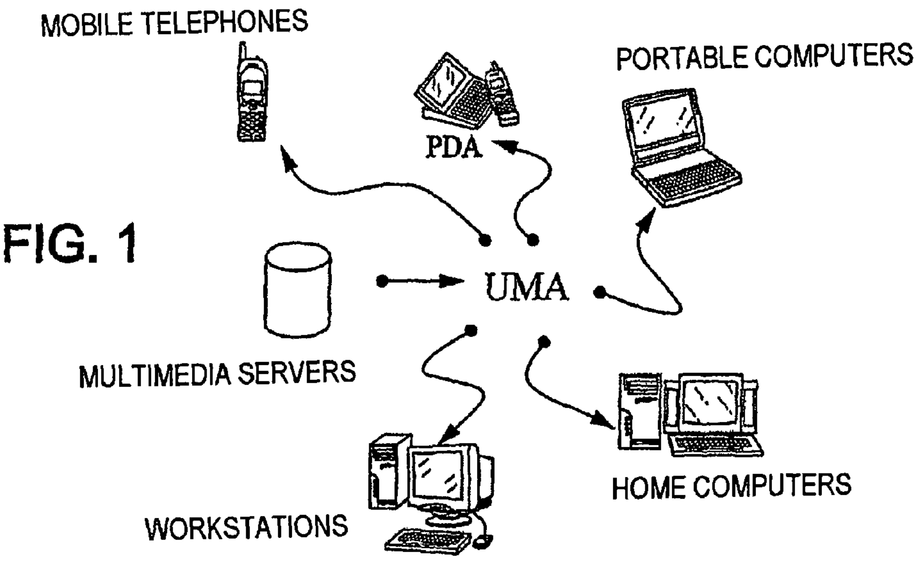
FIG. 1 diagrammatically illustrating the notion of universal access to multimedia content (UMA), FIGS. 2*a* and 2*b* representing the basic schemes of a perceptual frequency audio compression system, respectively on coding and on decoding, FIGS. 3*a* and 3*b* diagrammatically illustrating communication chains using conventional transcoding and intelligent transcoding, respectively, and FIG. 4 representing the block diagrams illustrating conventional transcoding (upper part of the figure) and intelligent transcoding (lower part of the figure), described hereinabove, FIGS. 5*a* and 5*b* diagrammatically represent the block diagrams defining the equivalence between the synthesis of the temporal signal and the analysis with a new bank of filters (FIG. 5*a*) and direct conversion between two sub-band domains (FIG. 5*b*)
Figure 2A:
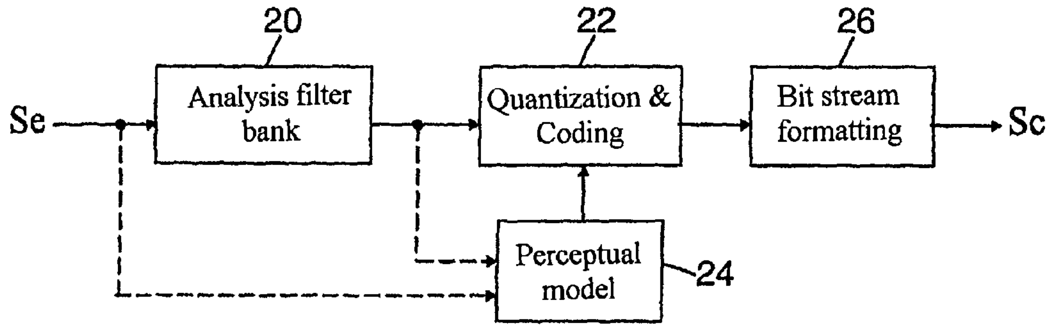
Figure 2B:
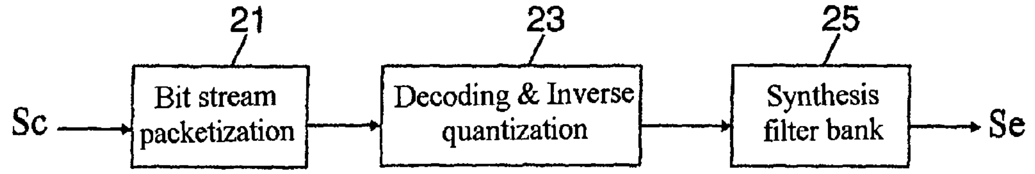
Figure 3A:
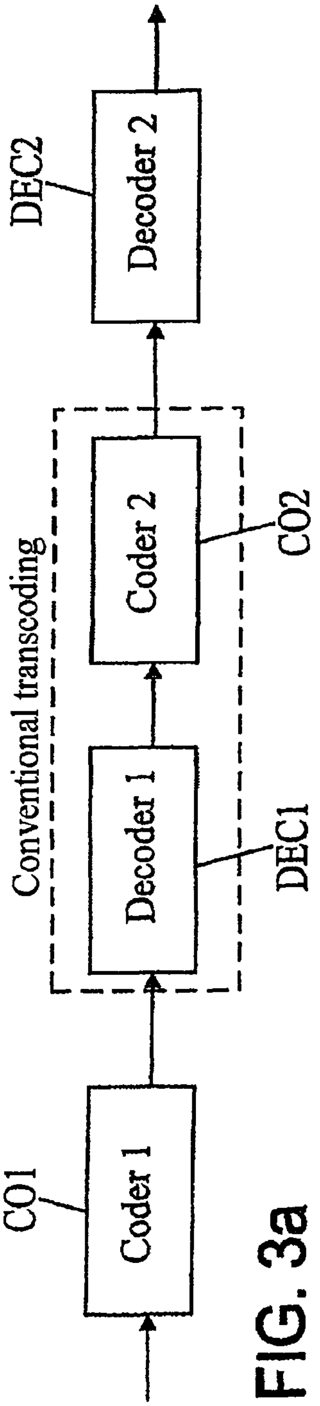
Figure 3B:
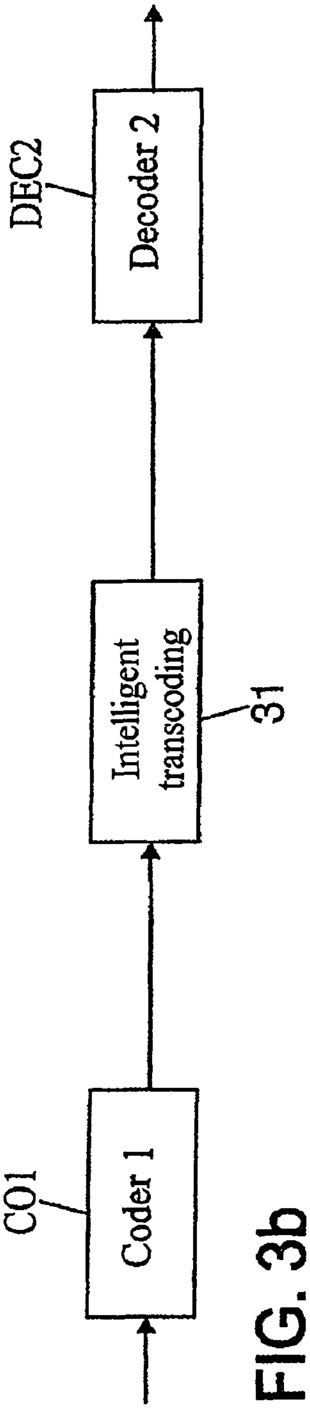
FIG. 3b PRIOR ART
Figure 4:
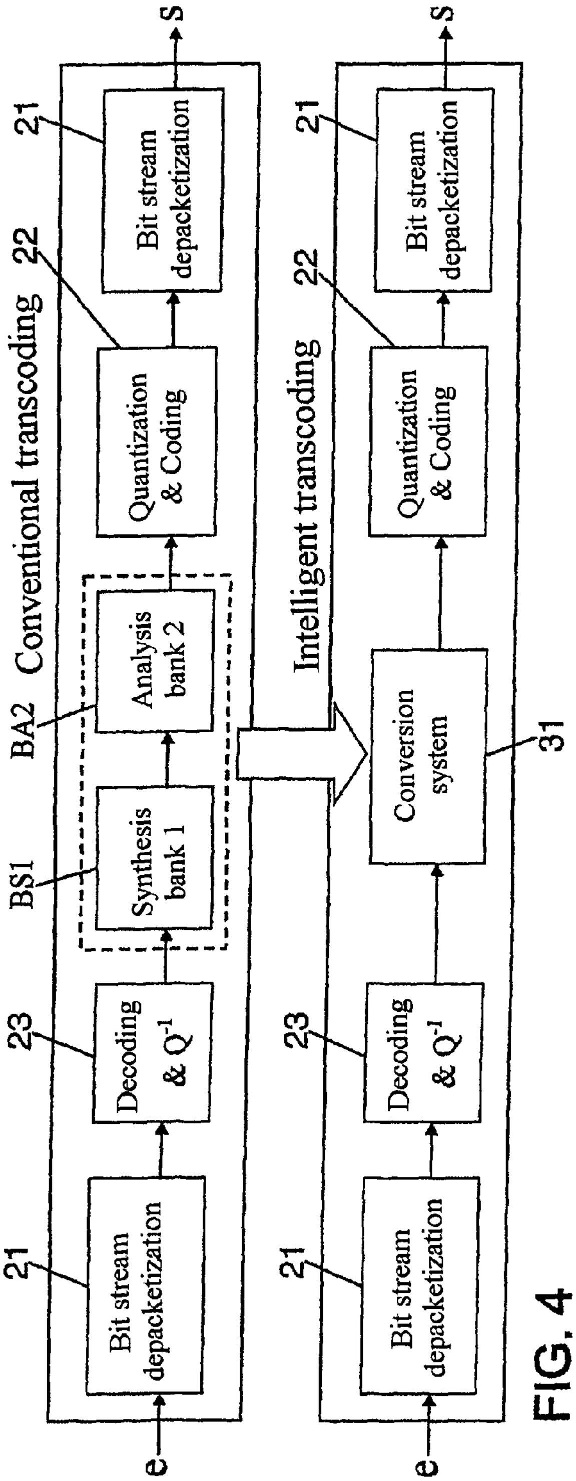
Figure 5A:
Figure 5B:
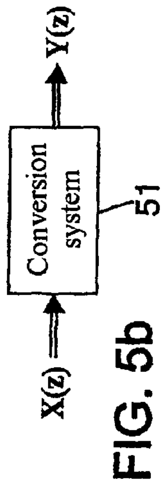

The principle of converting, between sub-band domains is illustrated by FIGS. 5*a* and 5*b*. It involves finding a system 51 for converting (FIG. 5*b*) between the vectors of the sub-band signals, X(z) and Y(z), equivalent to a cascading of the synthesis bank BS1 and of the analysis bank BA2 (FIG. 5*a*). The objective being to merge certain mathematical computation operations between these two filter banks to reduce the algorithmic complexity (that is to say the number of computation operations and the memory required). Another objective consists therefore in reducing to the minimum the algorithmic delay introduced by this transformation.

Figure 6:
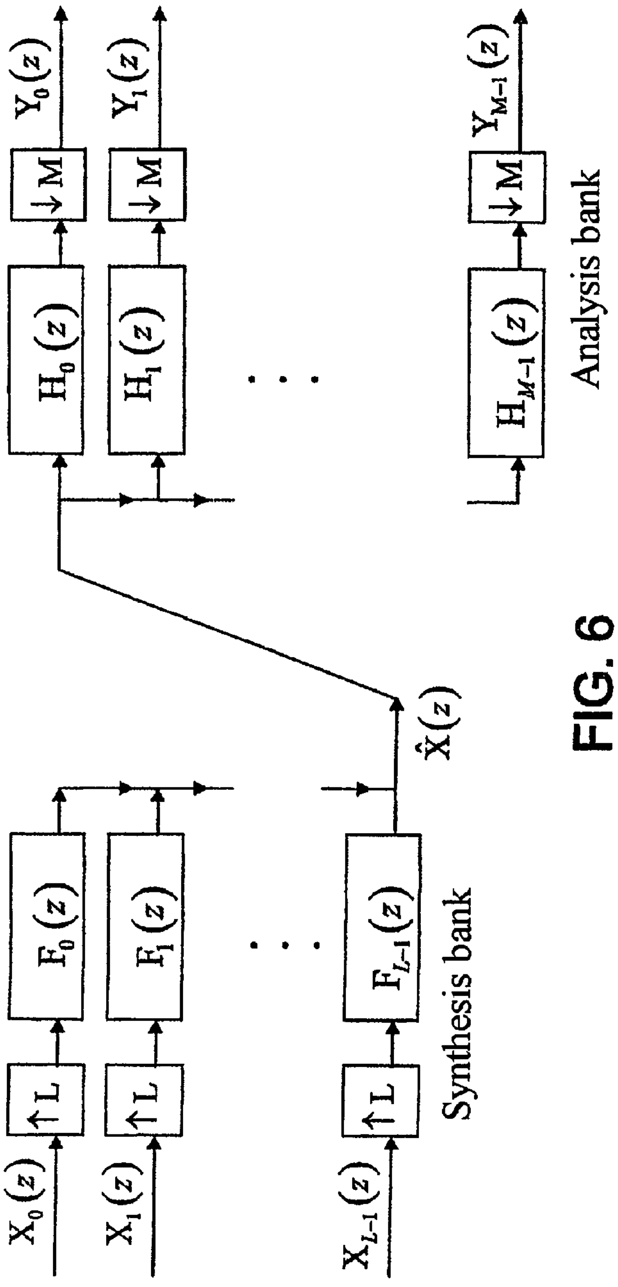
FIG. 6 illustrates a multirate blockwise representation of the conventional conversion between sub-band domains.

By using multirate blocks, the scheme of FIG. 5*a* can be represented by that of FIG. 6, in which an analysis filter bank follows a synthesis filter bank. The synthesis filter bank with L sub-bands is conventionally composed in each sub-band k, $0 \le k \le L-1$, of an operation of oversampling by a factor L followed by a filtering by the synthesis filter $F_k(z)$. The sub-band signal corresponding to the kth component of the input vector X(z) is therefore firstly oversampled then filtered by the filter $F_k(z)$. The temporal signal, $\hat{X}(z)$, synthesized at the output of this synthesis bank is thereafter obtained by summing the results of these filterings for $0 \le k \le L-1$.

This temporal signal thereafter constitutes the input for the analysis bank with M sub-bands. On each sub-band n, $0 \le n \le M-1$ it undergoes a filtering by the analysis filter $H_n(z)$ followed by an oversampling operation with factor M. A vector of sub-band signals, of size M, represented in the domain of the z-transform by Y(z) is then obtained at the output of this analysis bank. The synthesis of a time signal is therefore generally necessary in this conventional conversion system, in contradistinction to the conversion system described hereinafter within the meaning of the invention.

The conversion system within the meaning of the invention is therefore now described according to a general expression.

We denote by K the least common multiple of M and L (i.e. K=1 cm(M,L)), and $p_1$ and $p_2$ the natural integers such that:

$$K=p_1 M \text{ and } K=p_2 L. \tag{1}$$

We consider $U(z)=[X_0^T(z), X_1^T(z), \ldots X_{p_2-1}^T(z)]^T$ the vector resulting from the decomposition of the vector of signals, X(z), into $p_2$ polyphase components, and $V(z)=[Y_0^T(z), Y_1^T(z), \ldots Y_{p_1}{}^T{}_1(z)]^T$ the vector resulting from the decomposition of the signals vector, Y(z), into $p_1$ polyphase components.

We denote by g(z) the matrix of size M×L grouping together the products between the synthesis and analysis filters. The elements of this matrix may therefore be written as follows:

$$G_{nk}(z)=H_n(z)F_k(z),\ 0 \le n \le M-1,\ 0 \le k \le L-1. \tag{2}$$

and, in matrix form:

$$g(z)=h(z)f^T(z), \tag{3}$$

where $h(z)=[H_0(z)\ H_1(z)\ \ldots\ H_{M-1}(z)]^T$ and $f(z)=[F_0(z)F_1(z)\ \ldots\ F_{L-1}(z)]^T$ are respectively the vector of the analysis filters of the second filter bank, and the vector of the synthesis filters of the first filter bank.

The conversion between sub-band domains is given by the following formula:

$$V(z)=T(z)U(z) \quad (4)$$

The conversion matrix T(z) is of size K×K. Its expression is given by:

$$T(z)=[v(z)\otimes g(z)]|_{\downarrow k}, \quad (5)$$

where v(z) is the matrix of size $p_1 \times p_2$ whose elements are defined as follows:

$$v_{ij}(z)^{iM-jL},\ 0\le i\le p_1-1 \text{ and } 0\le j\le p_2-1. \quad (6)$$

The operation $\otimes$ denotes the Kronecker product such that:

$$\underset{I\times K}{A}\otimes\underset{J\times L}{B}=\underbrace{\begin{bmatrix} a_{00}B & \ldots & a_{0,K-1}B \\ \vdots & & \vdots \\ a_{I-1,0}B & \ldots & a_{I-1,K-1}B \end{bmatrix}}_{LI\times KL}. \quad (7)$$

It is recalled that the operation ↓K denotes decimation by a factor K, corresponding to a subsampling in which only one sample out of K samples is retained.

Figure 7:
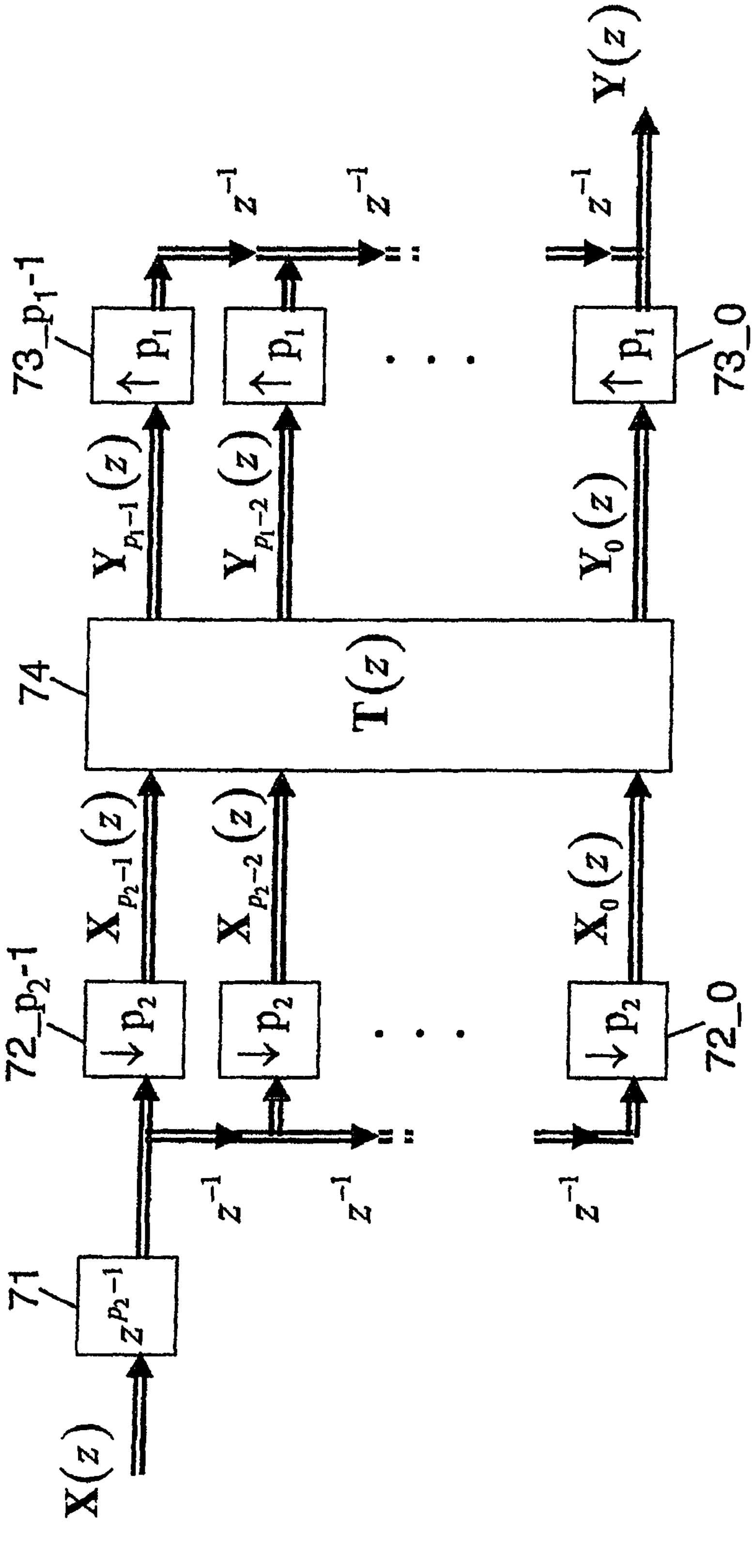
FIG. 7 is a multirate blockwise representation of the system for converting between sub-band domains, within the meaning of the invention, FIG. 8 diagrammatically summarizes the method of filtering in a conversion system, within the meaning of the invention.

The conversion system may be schematized as represented in FIG. 7 which shows that the system is advantageously a so-called "Linear Periodically Time Varying" or LPTV system, as will be seen later.

In FIG. 7, the input block 71 consisting of the advance $z^{p_2-1}$ and of the chain of delays, followed by the decimation 72_$p_2$−1 to 72_0 by a factor $P_2$, may be interpreted as a mechanism for arranging each succession of $p_2$ input vectors, denoted X[n], as blocks in a single vector U[k], of size K. The latter vector U[k] is applied thereafter to the filtering matrix T(z) (module 74) and the result is a vector v [k], of the same size as the vector U[k].

It is recalled that the notation X(z) relates simply to the expression of the vector X according to its z-transform, while the notation X[n] relates to the expression for the vector X in the time domain, convention for the person skilled in the art.

The last block 73_$p_1$−1 to 73_0 of FIG. 7 makes it possible finally to place the $p_1$ successive sub-vectors, each of size M, of the vector V[k] in series so as to yield as output the vectors Y[r].

Figure 8:
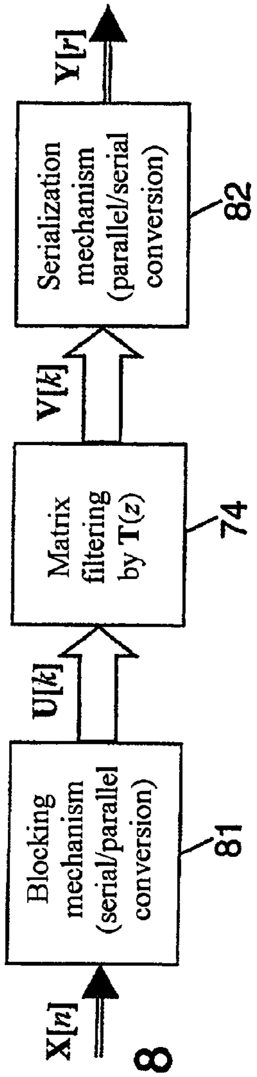

The input and output blocks of FIG. 7 are ultimately little different from the mechanisms for arranging in blocks 81 and then for placing in series 82, respectively, of FIG. 8 which summarizes the principal steps of the method within the meaning of the invention.

Advantageously, the conversion system within the meaning of the invention has minimal delay.

Specifically, one of the objectives of the sub-band domain conversion system is to minimize the algorithmic delay introduced. It is therefore necessary to introduce advances to reduce the delay. If we add in:

- an advance/delay $z^a$, a∈Z, at the input of the synthesis filter bank,
- and an advance/delay $z^b$, b∈Z, between the two filter banks, then formula (5) above becomes:

$$T(z)=[[z^{aL+b}z^{iM-jL}g(z)]|_{\downarrow K}]_{\substack{0\le i\le p_1-1,\\ 0\le j\le p_2-1}}, \quad (8)$$

The exponent $e_{ij}$=aL+b+(iM−jL), $0\le i\le p_1-1$, $0\le j\le p_2-1$ varies between the following two extreme values:

$$e_{min}=aL+b-(p_2-1)L=aL+b-K+L, \text{ for } i=0, j=p_2-1, \quad (9)\text{ a}$$

and $$e_{max}=aL+b+(p_1-1)M=aL+b+K-M, \text{ for } i=p_1-1, j=0. \quad (10)$$

The element filters of the matrix T(z) are all causal if and only if:

$$e_{max}\le K-1, \quad (11)$$

$$\text{i.e.: } aL+b\le M-1. \quad (12)$$

Conversion systems within the meaning of the invention may therefore be constructed with various delays and by making different choices regarding the parameters a and b, but on condition that the inequality (12) is preferentially satisfied.

The parameters a and b may therefore be seen as adjustment parameters making it possible to act on the algorithmic delay introduced by the system for converting between sub-band domains.

For a conversion system with minimal algorithmic delay, it is appropriate to introduce the maximum possible advance. The choice of a and b is therefore preferentially made in such a way that:

$$e_{max}=K-1, \quad (13)$$

$$\text{i.e.: } aL+b=M-1. \quad (14)$$

For this choice, formula (8) becomes:

$$T(z)=[[z^{M-1}z^{iM-jL}g(z)]|_{\downarrow K}]_{\substack{0\le i\le p_1-1,\\ 0\le j\le p_2-1}}, \quad (8)$$

or else:

$$T(z)=[v(z)\otimes g(z)]|_{\downarrow k}, \quad (16)$$

where, here, v(z) is the matrix whose elements are defined as follows:

$$v_{ij}(z)=z^{M-1+iM-jL},\ 0\le i\le p_1-1 \text{ and } 0\le j\le p_2-1. \quad (17)$$

Relation (16) is therefore the general formula for the conversion matrix T(z), which makes it possible to reduce to the minimum the algorithmic delay introduced by the conversion system within the meaning of the invention.

In what follows, we shall consider the case of a conversion system with minimal delay.

If we use the notation $e_{ij}$=M−1+(iM−jL), with $0\le i\le p_1-1$ and $0\le j\le p_2-1$, then the following interpretation of the matrix elements $\lfloor z^{e_{ij}}g(z)\rfloor|_{\downarrow k}$ of the matrix T(z) may be given on the basis of formula (15):

$$[z^{e_{ij}}g(z)]|_{\downarrow K}= \quad (18)$$

$$\begin{cases} \text{polyphase component number } e_{ij} \text{ of } g(z), & \text{if } 0\le e_{ij}\le K-1, \\ \text{polyphase component number } 0 \text{ of } z^{e_{ij}}g(z), & \text{if } e_{ij}<0. \end{cases}$$

It will be noted that the polyphase components considered in relation (18) correspond to a decomposition of type 1 to order K, as described for example in the aforesaid reference: "*Multirate Systems and Filter Banks*", P. P. Vaidyanathan, Prentice Hall, Englewood Cliffs, N.J., 1993.

This interpretation therefore makes it possible to construct the matrix T(z), directly from the polyphase components of type 1 to order K of the product filters $G_{nk}(z)=H_n(z)F_k(z)$ ($0 \le n \le M-1$ and $0 \le k \le L-1$) and of the corresponding filters constructed by adding delays.

To express the elements of the matrix T(z) more explicitly, we write:

$$T(z)=[T_{ml}(z)]_{0 \le m,l \le K-1}, \tag{19}$$

The element filters of the matrix T(z) may therefore be written as follows:

$$T_{ml}(z)=\begin{cases} G_{nk}^{e_{ij}}(z), & \text{if } 0 \le e_{ij} \le K-1, \\ z^{-1}G_{nk}^{K+e_{ij}}(z), & \text{if } e_{ij} < 0, \end{cases} \tag{20}$$

for $0 \le m$, $l \le K-1$.

In the latter formula (20), the integers i, n and j, k depend on l and on m as follows:

$$i=\left[\frac{m}{M}\right] \text{ and } n=m-iM, \tag{21}$$

$$j=\left[\frac{l}{L}\right] \text{ and } k=l-jL, \tag{22}$$

where $\lfloor x \rfloor$ denotes the integer part of the real number x.

The notation $G_{nk}^{r}(z)$ (with $0 \le r \le K-1$) indicates the polyphase component number r of the filter $G_{nk}(z)$, resulting from a decomposition of type 1 to order K.

The polyphase components $G_{nk}^{r}(z)$ (with $0 \le r \le K-1$) may be determined directly if the synthesis filters and the analysis filters have finite impulse responses (or "FIR"). In the case where one or both filter banks use recursive filters (with infinite impulse responses or "IIR"), the product filters $G_{nk}(z)$ also have infinite impulse responses. It is indicated that a general process for performing such a decomposition is indicated in annex A, entitled "*Polyphase decomposition of recursive filters*" from the reference: *"Traitement du signal audio dans le domaine codé: techniques et applications" [Audio signal processing in the coded domain: techniques and applications]*, A. Benjelloun Touimi, doctoral thesis from the école nationale supérieure des télécommunications de Paris, May 2001.

Indicated hereinafter is a solution within the meaning of the invention for the particular case where M=pL.

In the case where M=pL, it happens that K=1 cm(M,L)=M and $p_1=1$ whilst $p_2=p$. Formula (4) then becomes:

$$Y(z)=T(z)U(z). \tag{23}$$

where $U(z)=[X_0^T(z), X_1^T(z), \ldots X_p{}^T{}_1(z)]^T$ is the vector of polyphase components of order p of the vector of signals X(z).

The conversion matrix in this case is of size M×M and may be written as follows:

$$T(z)=[[z^{pL-1}g(z)]|_{\downarrow M}, [z^{(p-1)L-1}g(z)]|_{\downarrow M}, \ldots, [z^{L-1}g(z)]|_{\downarrow M}]. \tag{24}$$

This matrix is therefore the row vector consisting respectively of the polyphase components of general index (p−k) L−1 (where $0 \le k \le p-1$), according to a decomposition of type 1 to order M, of the matrix g(z), of products of synthesis and analysis filters.

More explicitly, the element filters of the matrix T(z) may be written as follows:

$$T_{ml}(z)=G_{mj}^{(p-k)L-1}(z),\ 0 \le m, l \le M-1, \tag{25}$$

where j and k are integers obtained from l through the relations:

$$k=\left[\frac{l}{L}\right] \text{ and } j=l-kL, \tag{26}$$

The notation $G_{mj}^{r}(z)$ (with $0 \le r \le M-1$) is aimed at the polyphase component of general index r of the filter $G_{mj}(z)$, resulting from a decomposition to order M.

Figure 9:
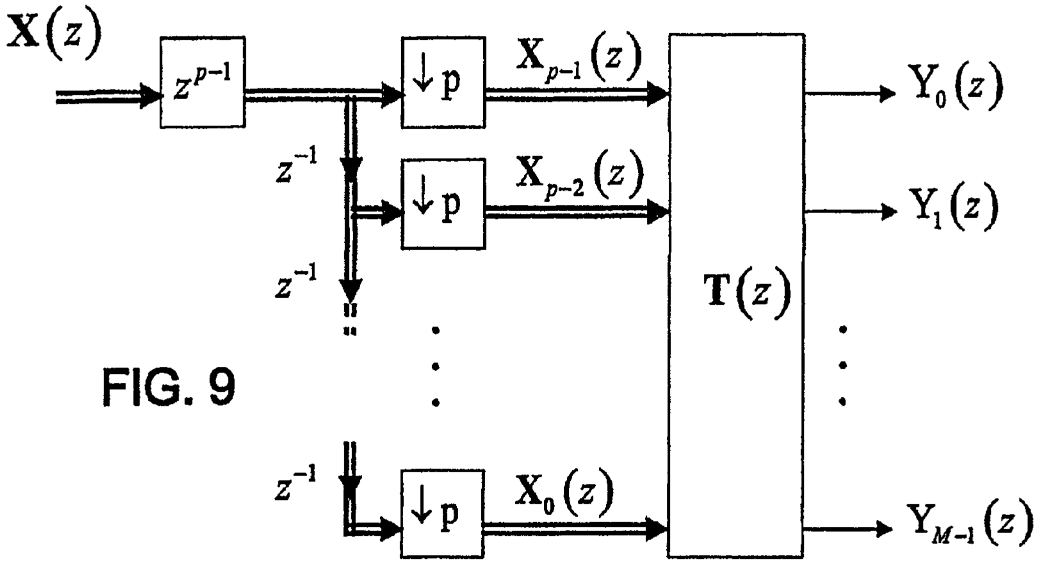
FIG. 9 is a multirate blockwise representation of the conversion system within the meaning of the invention, in the particular case where M=pL.
Figure 10:
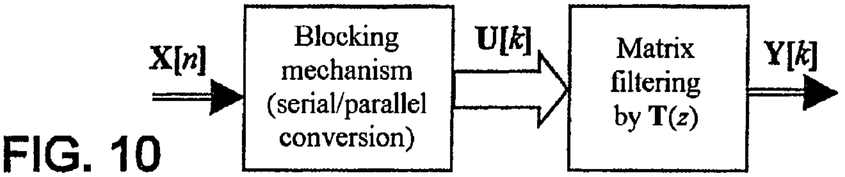
FIG. 10 illustrates the method of filtering in the conversion system within the meaning of the invention, in the particular case where M=pL.

The scheme of the conversion system is given in this particular case in FIG. 9 as a multirate representation and in FIG. 10 illustrating the principal steps of the filtering method.

Indicated hereinbelow is a solution within the meaning of the invention for the particular case where L=pM.

In this particular case, it happens that K=1 cm(M,L)=L and $p_1=p$ whilst $p_2=1$. Formula (4) then becomes:

$$V(z)=T(z)X(z), \tag{27}$$

where $V(z)=[Y_0^T(z), Y_1^T(z), \ldots Y_p{}^T{}_1(z)]^T$ is the vector of polyphase components of order p of the vector of signals Y(z).

The conversion matrix in this case is of size L×L and may be written as follows:

$$T(z)=\begin{bmatrix} [z^{M-1}g(z)]|_{\downarrow L} \\ [z^{2M-1}g(z)]|_{\downarrow L} \\ \vdots \\ [z^{pM-1}g(z)]|_{\downarrow L} \end{bmatrix}. \tag{28}$$

This matrix is therefore the column vector consisting respectively of the polyphase components of general index (k+1)M−1 (with $0 \le k \le p-1$), according to a decomposition of type 1 to order L, of the matrix g(z), of products of synthesis and analysis filters.

More explicitly, the element filters of the matrix T(z) may be written as follows:

$$T_{ml}(z)=G_{il}^{(k+1)M-1}(z),\ 0 \le m,\ l \le L-1, \tag{29}$$

where i and k are integers obtained from m through:

$$k=\left[\frac{m}{M}\right] \text{ and } i=m-kM. \tag{30}$$

The notation $G_{il}^{r}(z)$ (with $0 \le r \le L-1$) indicates the polyphase component of general index r of the filter $G_{il}(z)$, resulting from a decomposition to order L.

A possible choice for the parameters a and b consists in taking a=0 and b=M−1. Other choices may be envisaged on condition that the equality (14) is preferentially satisfied so as to end up with a system with minimal delay.

Figure 11:
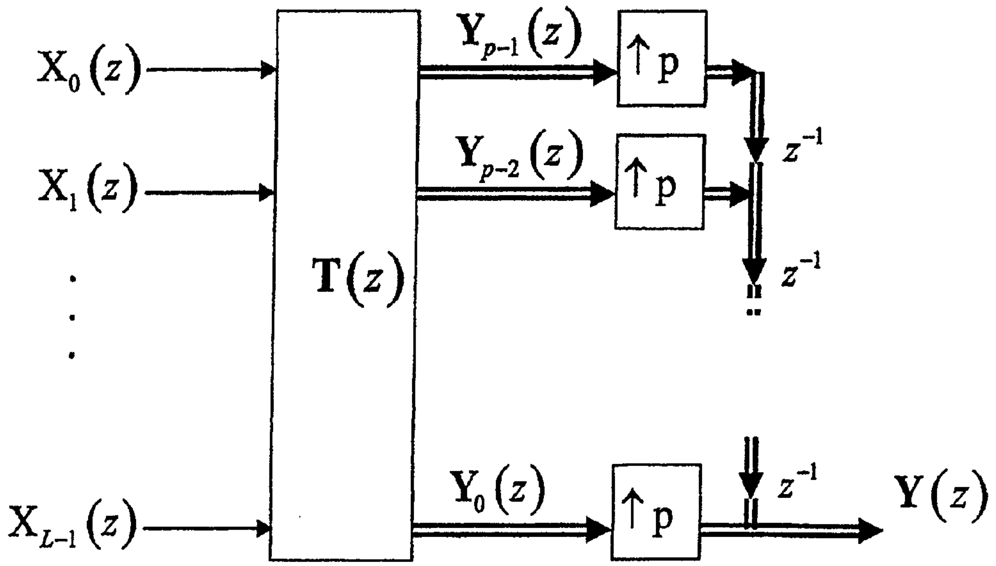
FIG. 11 is a multirate blockwise representation of the conversion system within the meaning of the invention, in the particular case where L=pM.
Figure 12:
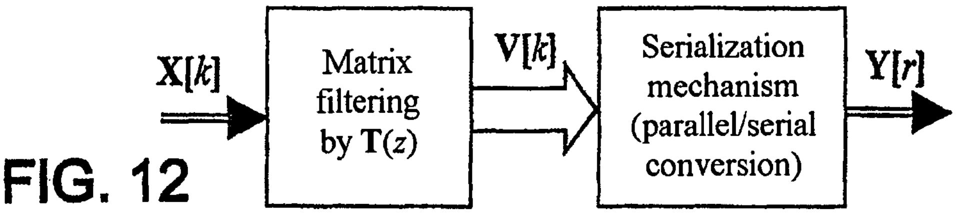
FIG. 12 illustrates the method of filtering in the conversion system in the particular case where L=pM.

The scheme of the conversion system is given in this case in FIG. 11 as a multirate representation and in FIG. 12 illustrating the principal steps of the filtering method in this particular case where L=pM.

The conversion system within the meaning of the invention will now be described according to the aspect of a linear periodically time varying system. It is indicated in this case that the filters of the synthesis and analysis banks are preferentially critical sampling filters.

The scheme of the conversion system given by FIG. 7 shows that it is a linear periodically time varying or "LPTV" system within the meaning of the reference: "*Multirate Systems and Filter Banks*", P. P. Vaidyanathan, Prentice Hall, Englewood Cliffs, N.J., 1993, in section 10.1.

To determine the period of this system and find its equivalent structure which clearly illustrates this property, we firstly set out the particular cases L=pM and M=pL hereinbelow.

We denote by $f_s$ the sampling frequency of the signal in the time domain, and $f_{s_1}$ and $f_{s_2}$ the sampling frequencies in the domains of the first and second filter banks, respectively. We also denote by $T_s$, $T_{s_1}$ and $T_{s_2}$ the respectively corresponding sampling periods. These parameters satisfy the following relations:

$$f_{s1} = \frac{f_s}{L},\ f_{s2} = \frac{f_s}{M} \quad (31)$$

Figure 13:
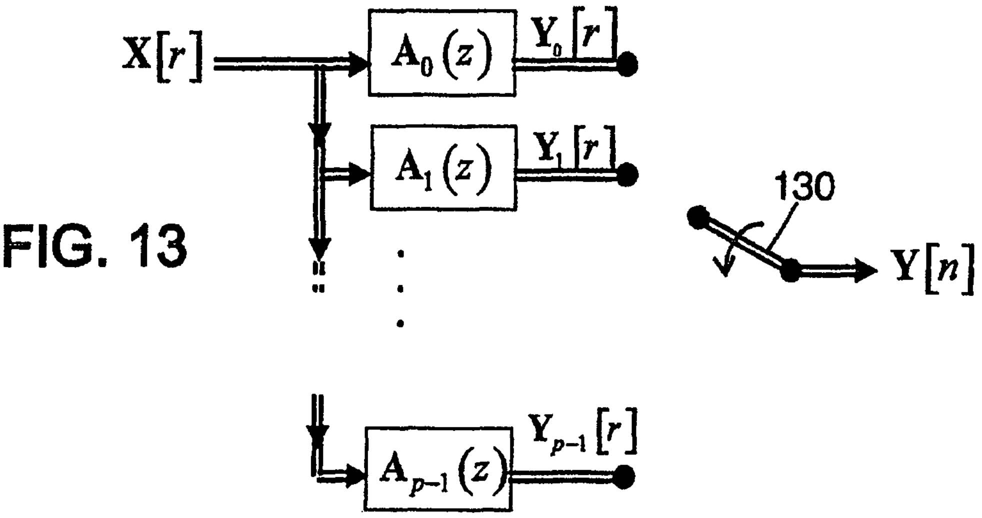
FIG. 13 is a representation of the conversion system in the case L=pM in the guise of LPTV system, with a different input bit rate from the output bit rate.

In the particular case where L=pM, taking account of the scheme of FIG. 7 and formula (28) for the conversion matrix, we can deduce therefrom that the conversion system is linear periodically time varying with a period $pT_{s_2}=T_{s_1}$. It can be represented by the structure of FIG. 13. It is characterized by the set of p transfer matrices $A_k(z)$ (with $0\le k\le p-1$) defined by:

$$A_k(z)=[z^{(k+1)M-1}g(z)]|_{\downarrow L},\ 0\le k\le p-1, \quad (32)$$

This system does not have the same bit rate at input and at output. The bit rate at input is $f_{s_1}$ and the output bit rate is $f_{s_2}=pf_{s_1}$. The transfer matrices $A_k(z)$ operate at the sampling frequency $f_{s_1}$ and the global system operates as if a switch 130 (FIG. 13), at the output of the system, were toggling in a circular manner also at this same frequency $f_{s_1}$ of an output from one matrix block $A_k(z)$ to the other.

It will also be noted that the output of the system Y[n], at the instant $nT_{s_2}$, is equal to the output of the matrix $A_k(z)$, at the instant $$p\left\lfloor\frac{n}{p}\right\rfloor T_{s2} = \left\lfloor\frac{n}{p}\right\rfloor T_{s1},$$

where k=n mod p.

Figure 14:
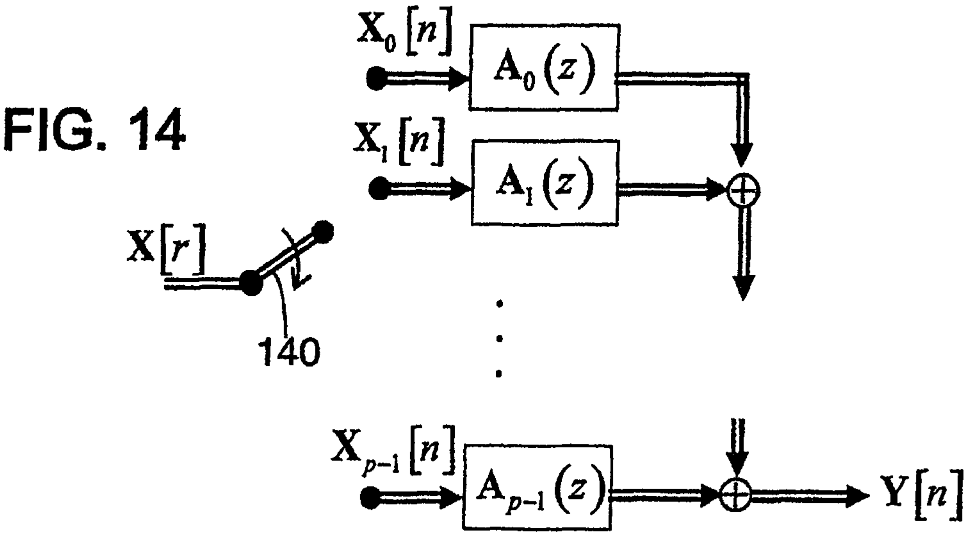
FIG. 14 is a representation of the conversion system in the case M=pL in the guise of LPTV system, with an input bit rate different from the output bit rate.

In the other particular case where M=pL, taking account of formula (24) for the conversion matrix applied in this case, the scheme of FIG. 7 becomes that of FIG. 14.

This conversion system may be viewed as an LPTV system with period $pT_{s_1}=T_{s_2}$, characterized by the set of p matrices $A_k(z)$ (with $0\le k\le p-1$) defined by relation (33) and followed by a summation over all their outputs, with therefore:

$$A_k(z)=[z^{(p-k)L-1}g(z)]|_{\downarrow M},\ 0\le k\le p-1, \quad (33)$$

The bit rate at the input of this system is $f_{s_1}=pf_{s_2}$ and the output bit rate is $f_{s_2}$. The transfer matrices $A_k(z)$ operate at the sampling frequency $f_{s_2}$ and the system operates globally as if a switch 140 (FIG. 14), at the input of the system, were toggling in a circular manner at this same frequency $f_{s_2}$, of an input from one matrix block $A_k(z)$ to the other.

It is indicated moreover that the output of the conversion system Y[n], at the instant $nT_{s_2}$, is equal to the sum of the outputs of the $A_k(z)$ (with $0\le k\le p-1$) each fed by X[(n−1)p+k+1] at the respective instants:

$$((n-1)p+k+1)T_{s_1}=(n-1)T_{s_2}+(k+1)T_{s_1}.$$

Figure 15:
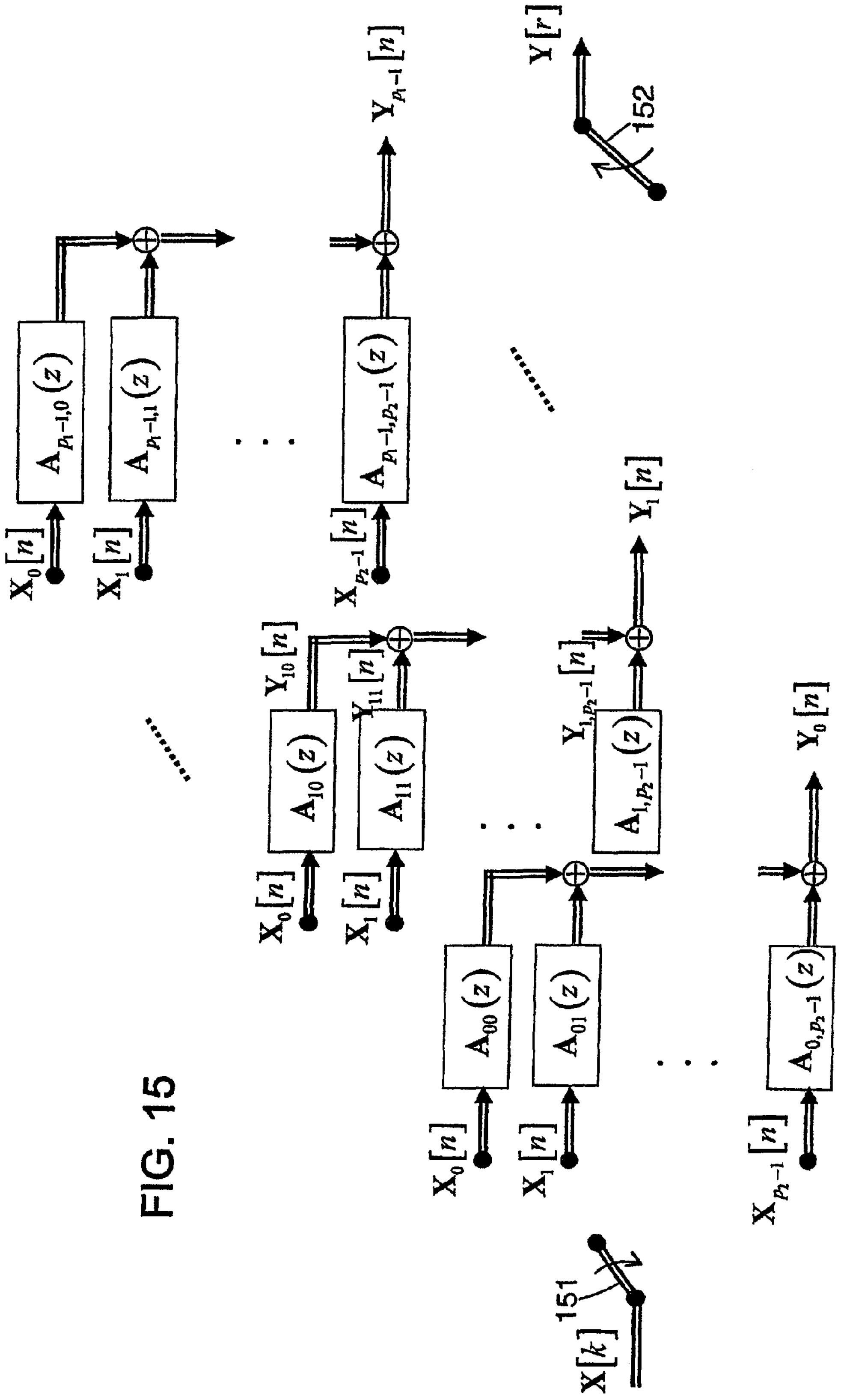
FIG. 15 is a representation of the conversion system within the meaning of the invention, in the guise of LPTV system, in the general case where M and L are not related by a particular proportionality relation.

We now describe the manner of operation of the system in the general case where M and L are not necessarily related by a proportionality relation. Taking account of the form of the matrix T(z) given by relation (15), of the scheme of FIG. 7 and of the explanations given above for the two particular cases L=pM and M=pL, the conversion system in the general case may be schematized as represented in FIG. 15. The general system comprises $p_1$ linear periodically time varying subsystems, each of period $p_2T_{s_1}$. The LPTV subsystem of order i (with $0\le i\le p_1-1$), from this set, is characterized by the following $p_2$ transfer matrices $A_{ij}(z)$:

$$A_{ij}(z)=[z^{M-1}z^{iM-jL}g(z)]|_{\downarrow K},\ 0\le j\le p_2-1. \quad (34)$$

The whole set of these subsystems operates in parallel and one of their outputs is chosen periodically as output of the system with a period $p_1T_{s_1}$. The global system is also linear periodically time varying of period $KT_s$. Specifically:

$$K = p_2L = p_1M \text{ and } T_s = \frac{T_{s1}}{L} = \frac{T_{s2}}{M}, \quad (35)$$

$$\text{therefore } p_1T_{s_2}=p_2T_{s_1}=KT_s. \quad (36)$$

The two switches 151 and 152 represented respectively at the input and the output of the structure of FIG. 15 operate with a frequency $$\left\lfloor\frac{f_s}{K}\right\rfloor$$

which is also the operating frequency of the transfer matrices. $A_{ij}(z)$.

The output of the system Y[n], at the instant $nT_{s_2}$, is equal to the output of the LPTV subsystem number i, at the instant $nT_{s_2}$, where i=n mod $p_1$. The input of the system X[k], at the instant $kT_{s_1}$, is steered towards the inputs of number j, of each of the $p_1$ LPTV subsystems, where j=k mod $p_2$.

The bit rate at the input of this system is $f_{s_1}$ and the output bit rate is $f_{s_2}$ allowing processing of the input data, on the fly, by the conversion system within the meaning of the invention.

It is recalled that the expressions for the filters $A_{ij,nk}(z)$ (where $0\le n\le M-1$ and $0\le k\le L-1$), the elements of a transfer matrix $A_{ij}(z)$, depend on $e_{ij}$, hence on the indices i and j, and may be written as follows:

$$A_{ij,nk}(z)=G_{nk}^{e_{ij}}(z),\ \text{if } 0\le e_{ij}\le K-1, \quad (37)$$

$$\text{and } A_{ij,nk}(z)=z^{-1}G_{nk}^{K+e_{ij}}(z),\ \text{if } e_{ij}<0. \quad (38)$$

Described below is an advantageous implementation of the conversion system within the meaning of the invention.

We will denote by $N_1$ the length of the filters $F_k(z)$ (where $0\le k\le L-1$), and by $N_2$ the length of the filters $H_n(z)$ (where $0\le n\le L-1$). These notations are used only in the case where these filters have finite impulse responses and have the same length for each of the two filter banks.

The following expressions will be used for the vectors at the input and at the output of the matrix filtering block based on T(z):

$$U(z)=[U_0(z)U_1(z)\ \ldots\ U_{K-1}(z)]^T, \quad (39)$$

$$\text{and } V(z)=[V_0(z)V_1(z)\ \ldots\ V_{K-1}(z)]^T. \quad (40)$$

An implementation based on matrix filtering results directly from formula (4) and from the scheme representative of the conversion system of the general FIG. 8. Thus, each signal $V_m[k]$, with $0 \le m \le K-1$, a component of the vector V[k], is the sum of the results of the filtering of each of the signals $U_l[k]$, with $0 \le l \le K-1$, by the filter $T_{ml}(z)$.

In the case of finite impulse response synthesis and analysis filter banks, all the element filters of the matrix T(z) will also be finite impulse response filters. Conventionally, it is possible in this case to use fast filtering processes based on convolution-multiplication properties.

In the case of infinite impulse response filters, it is indicated that it is possible to factorize certain denominators between the elements of the matrix T(z) during implementation.

An implementation using an overlap transform is now described. It is assumed here that the filters of the synthesis and analysis banks are of the finite impulse response and maximal decimation type.

The conversion matrix T(z) is expressed as follows:

$$T(z) = \sum_{n=0}^{N-1} P_n z^{-n}, \tag{41}$$

where the $P_n$ are matrices of size K×K, and N corresponds to the maximum of the lengths of the filters $T_{ml}(z)$, the elements of T(z).

This length N, in the most general case, is given by the following expression:

$$N = \begin{cases} \left\lfloor \frac{N_1 + N_2 - 2}{K} \right\rfloor + 2, & \text{if } r_0 \ge M + L \text{ and } M \text{ and } L \text{ are not multiples of one another,} \\ \left\lfloor \frac{N_1 + N_2 - 2}{K} \right\rfloor + 1, & \text{otherwise,} \end{cases} \tag{42}$$

where $r_0$ is given by:

$$r_0 = (N_1 + N_2 - 2) \bmod K. \tag{43}$$

In what follows, the following definition of the length N is used:

$$N = \left\lfloor \frac{N_1 + N_2 - 2}{K} \right\rfloor + 2. \tag{44}$$

taking account of variations on a case by case basis.

The operation of filtering by the matrix T(z) can then be written as follows:

$$V[n] = \sum_{i=0}^{N-1} P_i U[n-i]. \tag{45}$$

We consider the matrix P, of size NK×K, defined by:

$$P = \begin{bmatrix} P_0 \\ P_1 \\ \vdots \\ P_{N-1} \end{bmatrix}. \tag{46}$$

The system can therefore be constructed by a matrix transform P, followed by an operation of addition with overlap. This implementation is similar to the synthesis part of an overlap transform "LT", as described in particular in: "*Signal Processing with Lapped Transforms*", H. S. Malvar, Artech House, Inc. 1992.

Figure 16:
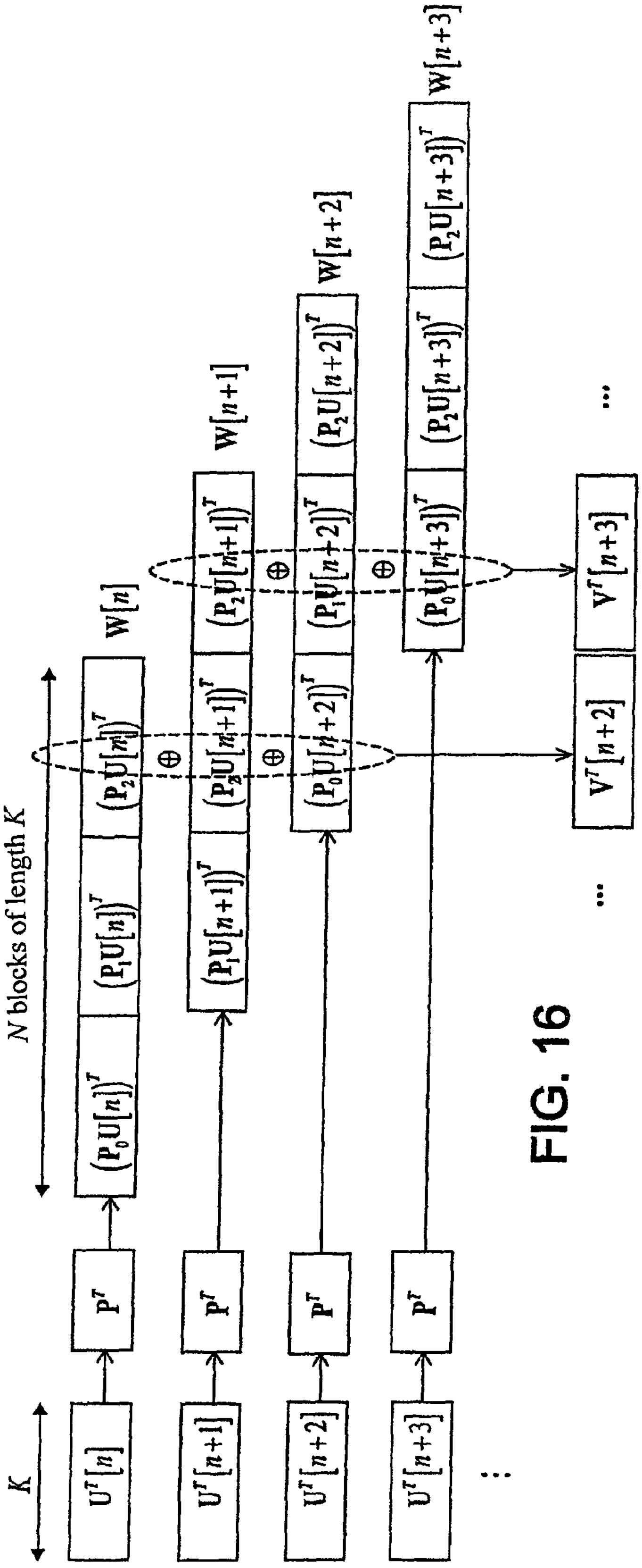
FIG. 16 illustrates an implementation of the conversion system within the meaning of the invention by a transform and an operation of addition with overlap (termed OLA standing for "Overlap and Add") in the case where N=3.

It is represented in FIG. 16 for the particular case where N=3. The matrix P will be called the "conversion transformed matrix".

The computation procedure for converting between sub-band domains may then be summarized as follows:

1. Construction of a vector U[n] on the basis of $p_2$ successive vectors input to the conversion system and corresponding to the vectors of the sub-band signals X[k] of the first filter bank.
2. Transformation of the vector U[n] by the conversion transformed matrix P to obtain the vector W[n]:

$$W[n] = PU[n]. \tag{47}$$

3. Operation of addition with overlap on the N successive vectors W[n−N+1], . . . , W[n−1] and W[n] as illustrated in FIG. 16. The output of this operation is the vector V[n].
4. Placing of the successive sub-vectors, of sizes M, of the vector V[n] in series to obtain the vectors of the sub-band signals Y[r] of the domain of the second filter bank.

Described hereinbelow is an implementation based on the representation of the system in the guise of an LPTV system, according to a preferred embodiment.

The method presented hereinbelow provides a parallelism in the processing and an efficient utilization of the computer resources (software or hardware) for the implementation of the method. It is therefore a currently preferred embodiment, at least in the case of finite impulse response filter banks.

We consider the matrices $B_{ij}$, (with $0 \le i \le p_1-1$ and $0 \le j \le p_2-1$), of size NM×L, as the transformed matrices associated with each of the transfer matrices $A_{ij}(z)$ defined above. If these matrices are expressed by $$A_{ij}(z) = \sum_{n=0}^{N-1} B_{ij,n} z^{-n},$$

where the matrices $B_{ij,n}$ are of size M×L, then the matrix $B_{ij}$ may be defined as follows:

$$B_{ij} = [B_{ij,0}{}^T B_{ij,1}{}^T \ldots B_{ij,N-1}{}^T]^T. \tag{48}$$

As each transfer matrix $A_{ij}(z)$ contains filters of identical lengths and which depend on the value of $e_{ij}$, then the corresponding matrix $B_{ij}$ also depends on $e_{ij}$. The matrices $B_{ij}$ contain zero sub-matrices and their forms are given as follows:

For $0 \le e_{ij} \le K-1$,

If $0 \le e_{ij} \le r_0-1$ then:

$$B_{ij} = [B_{ij,0}{}^T B_{ij,1}{}^T \ldots B_{ij,N-3}{}^T B_{ij,N-2}{}^T 0_{L\times M}]^T. \tag{49}$$

If $r_0 \le e_{ij} \le K-1$ then:

$$B_{ij} = [B_{ij,0}{}^T B_{ij,1}{}^T \ldots B_{ij,N-3}{}^T 0_{L\times M} 0_{L\times M}]^T. \tag{50}$$

For $e_{ij} < 0$,

If $0 \le K+e_{ij} \le r_0-1$ then:

$$B_{ij} = [0_{L\times M} B_{ij,1}{}^T \ldots B_{ij,N-3}{}^T B_{ij,N-2}{}^T B_{ij,N-1}{}^T]^T. \tag{51}$$

It will be noted that this case exists only if $K+e_{min} \le r_0-1$. Now, $e_{min}$=M+L−1−K, so that the existence condition for this case is such that $r_0 \ge M+L$.

If $r_0 \le K+e_{ij} \le K-1$ then:

$$B_{ij} = [0_{L\times M} B_{ij,1}{}^T \ldots B_{ij,N-3}{}^T B_{ij,N-2}{}^T 0_{L\times M}]^T. \tag{52}$$

It is recalled that $0_{L\times M}$ denotes the zero matrix of size L×M.

Advantageously, the zero blocks of the matrices $B_{ij}$ allow a reduction in computation during a transformation of an input vector by this matrix.

The following relation will be noted between the sub-matrices $P_n$ of P and the sub-matrices $B_{ij,n}$:

$$P_n = [B_{ij,n}]_{\substack{0 \le i \le p_1 - 1, \\ 0 \le j \le p_2 - 1}}, \quad (53)$$

$$0 \le n \le N-1.$$

Figure 17:
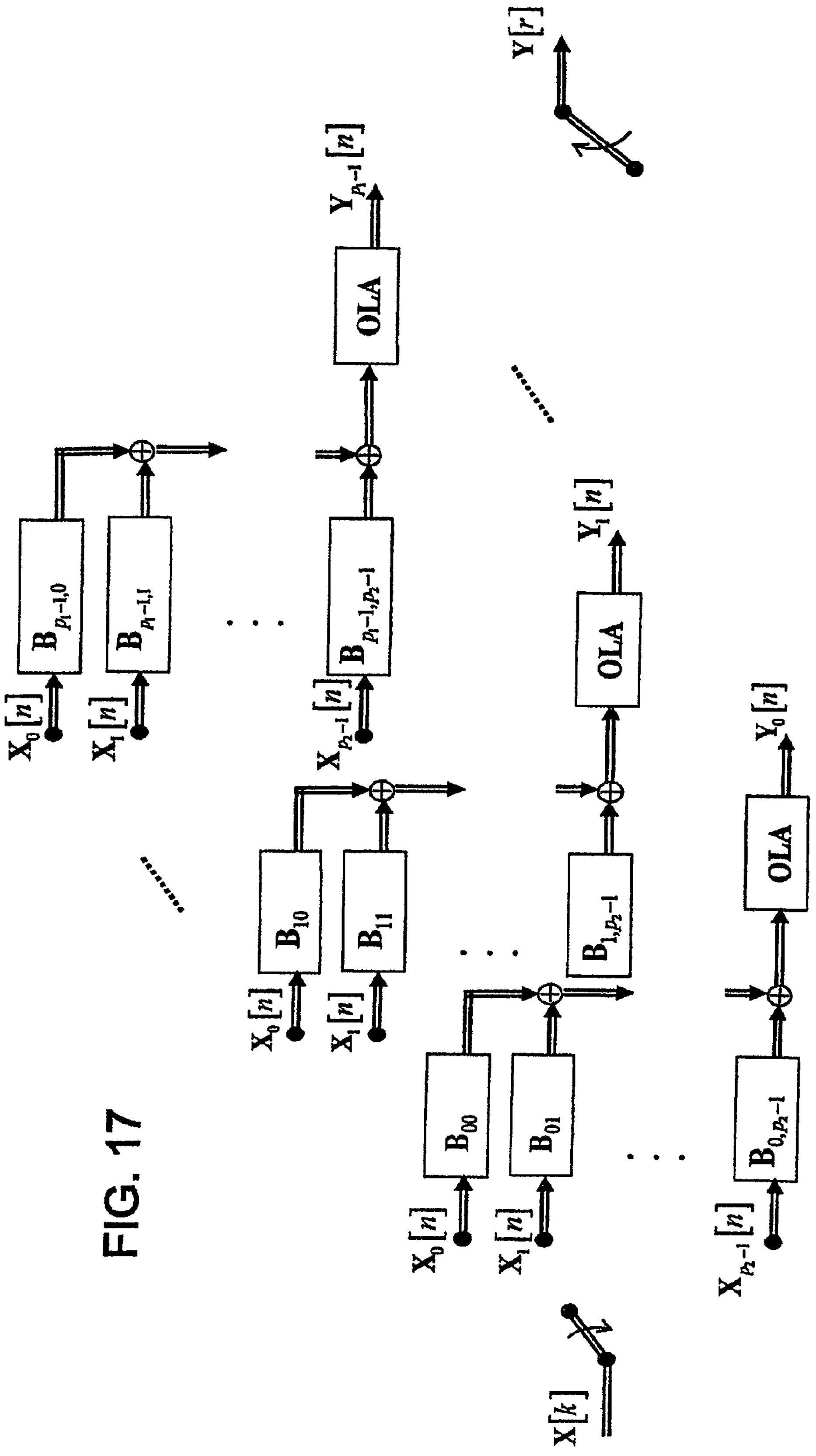
FIG. 17 illustrates the conversion system within the meaning of the invention in an embodiment corresponding, to a transform and an addition with overlap OLA for efficient implementation allowing processing on the fly.

The computation procedure for converting between sub-band domains is illustrated in FIG. 17 and is conducted as follows:

1. Each new input vector X[k] is oriented towards a common memory of the subsystems characterized by the transformed matrices $B_{ij}$, where $0 \le i \le p_1 - 1$, such that j=k mod $p_2$.
2. For each fixed i where $0 \le i \le p_1 - 1$,
   a. For j=k mod $p_2$, application of the transform $B_{ij}$ to the vector X[k]. During this transformation, advantageous account is taken of the zero blocks of the matrix $B_{ij}$.
   b. Summation of all the transformed vectors resulting from step 2.a, for j=0, . . . , $p_2 - 1$.
   c. Addition with overlap "OLA" (standing for "Overlap and Add") on the sum vectors resulting from step 2.b to construct the output $Y_i[n]$ of the LPTV subsystem number i.
3. The output Y[n] of the conversion system corresponds to the output $Y_i[n]$ of the LPTV subsystem number i such that i=n mod $p_1$.

The addition with overlap of step 2.c is done on vectors of length NM with an overlap of (N−1)M elements.

It will be noted that this procedure is still based on the principle of the scheme of FIG. 15.

In the particular case M=pL, we express $$A_j(z) = \sum_{n=0}^{N-2} B_{j,n} z^{-n},$$

with $0 \le j \le p-1$, and we denote by $B_j$ the corresponding transformed matrix. This matrix has the following form:

$$B_j = \begin{cases} [B_{j,0}^T B_{j,1}^T \ \ldots \ B_{j,N-3}^T 0_{L \times M}]^T, & \text{if } 0 \le j \le j_0, \\ [B_{j,0}^T B_{j,1}^T \ \ldots \ B_{j,N-3}^T B_{j,N-2}^T]^T, & \text{if } j_0 + 1 \le j \le p-1, \end{cases} \quad (54)$$

$$où \ j_0 = p - \left\lfloor \frac{r_0 + 1}{L} \right\rfloor.$$

$$\text{where } j_0 = p - \left\lfloor \frac{r_0 + 1}{L} \right\rfloor.$$

The computational steps for converting between sub-band domains, as is illustrated in FIG. 18, are conducted as follows:

1. Each new input vector X[k] is oriented towards a memory of the subsystem characterized by the transformed matrix $B_j$, such that j=k mod p.
2. For j=k mod p, application of the transform $B_j$ to the vector X[k].
3. Summation of the vectors resulting from step 2, output by the subsystems characterized by the transformed matrices $B_j$, for $0 \le j \le p-1$.
4. The output Y[n] of the conversion system corresponds to the result of the addition with overlap on the sum vectors resulting from step 3.

In the particular case where L=pM we write:

$$A_i(z) = \sum_{n=0}^{N-2} B_{i,n} z^{-n}, \ 0 \le i \le p-1,$$

and we denote by $B_i$ the corresponding transformed matrix. This matrix has the following form:

$$B_i = \begin{cases} [B_{i,0}^T B_{i,1}^T \ \ldots \ B_{i,N-3}^T B_{i,N-2}^T]^T, & \text{if } 0 \le i \le i_0, \\ [B_{i,0}^T B_{i,1}^T \ \ldots \ B_{i,N-3}^T 0_{L \times M}]^T, & \text{if } i_0 + 1 \le i \le p-1, \end{cases} \quad (55)$$

$$\text{where } i_0 = \left\lfloor \frac{r_0}{M} \right\rfloor - 1.$$

The computational steps for converting between sub-band domains is illustrated in FIG. 19 and are conducted preferentially as follows:

1. Each new input vector X[k] is oriented towards the common memory of all the subsystems characterized by the transfer matrices A, (z), with $0 \le i \le p-1$.
2. For each fixed i, such that $0 \le i \le p-1$, application of the transform $B_i$ to the vector X[k] then addition with overlap to obtain the vector $Y_i[n]$.
3. The output Y[n] of the conversion system then corresponds to the output $Y_i[n]$ of the subsystem characterized by the transfer matrix $A_i[z]$ such that i=n mod p.

The filter banks most widely used in audio coding are described hereinbelow. It is also indicated that the parameters of the conversion system for various cases of switching between filter banks using such coding formats are given in FIG. 27, where the parameter N is given by formula (56) above.

For a conversion between modulated cosine FIR filter banks, the filter bank is characterized by the fact that the analysis and synthesis filters are obtained through a cosine modulation of a low-pass prototype filter H(z). For a filter bank with M bands, the expression for the impulse responses of the analysis and synthesis filters is given in by:

$$h_k[n] = h[n]\cos\left[\frac{\pi}{M}\left(k + \frac{1}{2}\right)\left(n - \frac{N-1}{2}\right) - \theta_k\right], \ 0 \le k \le M-1, \quad (57)$$

$$f_k[n] = h[n]\cos\left[\frac{\pi}{M}\left(k + \frac{1}{2}\right)\left(n - \frac{N-1}{2}\right) + \theta_k\right], \ 0 \le k \le M-1, \quad (58)$$

with $0 \le n \le N-1$ and $$\theta_k = \frac{(2k+1)\Pi}{4}$$

and where h[n] is the impulse response of the prototype filter, of length N.

Filter banks of this type possess the property of perfect reconstruction if additionally the following conditions are satisfied:

the length of the filters is given by N=2 mM, where, m is an integer, the synthesis filters are given by $f_k[n] = h_k[N-1-n]$, the prototype filter has linear phase $h[n]=h[N-1-n]$, and the polyphase components of order 2M of the prototype filter H(z) moreover satisfy the power complementarity condition, thereby making it possible to design the prototype filter.

Equations (57), (58) and the conditions above make it possible to completely characterize a modulated cosine and perfect reconstruction filter bank.

These modulated cosine and perfect reconstruction filter banks are the basis of all the filter banks of contemporary audio coders. Even the pseudo-QMF filter bank of the MPEG-1/2 layer I&II coders may be associated with this category provided that the prototype filter is sufficiently well designed to consider that perfect reconstruction is satisfied.

For the conversions between MDCT transforms of different sizes, constituting a particular case of modulated cosine and perfect reconstruction filter banks, an example may be the TDAC filter bank for which N=2M and m=1. The latter may be considered to be an MLT transform (standing for "Modulated Lapped Transform") also known by the name MDCT (standing for "Modified DCT"). This transform is used in the majority of contemporary frequency audio coders (MPEG-2/4 AAC, PAC, MSAudio, TDAC, etc.).

The expressions for the synthesis and analysis filter banks are given by:

$$f_k[n] = \sqrt{\frac{2}{M}}\, h[n]\cos\left[\frac{\pi}{M}\left(k+\frac{1}{2}\right)\left(n+\frac{M+1}{2}\right)\right], \quad (59)$$

$$0 \le k \le M-1,\ 0 \le n \le 2M-1,$$

and $$h_k[n] = f_k[2M-1-n]. \quad (60)$$

To ensure perfect reconstruction, the window h[n] must satisfy the symmetry condition: $h\lfloor 1\rfloor=h\lfloor 2M-1-l\rfloor$, and power complementarity condition: $h^2\lfloor 1\rfloor+h^2\lfloor 1+M\rfloor=1$.

A possible and simple choice for the prototype filter satisfying these conditions is given by the following sinusoidal window:

$$h[n] = \sin\left[\left(n+\frac{1}{2}\right)\frac{\pi}{2M}\right],\ 0 \le n \le 2M-1. \quad (61)$$

This choice of window is used in the TDAC and G.722.1 coders. Another choice consists in taking a window derived from the Kaiser-Bessel window (or "KBD") as in the case of MPEG-4 AAC, BSAC, Twin VQ and AC-3 coders.

It will thus be understood that formulae (59) and (60) and the choice of the window h[n] therefore completely define the filter bank corresponding to the MDCT transform.

As far as a conversion between the PQMF filter bank of MPEG-1 and an MDCT is concerned, it is indicated that the filter bank in the MPEG-1/2 Layer I&II coder is a pseudo-QMF with M=32 bands. These analysis and synthesis filters are defined as follows:

$$h_k[n] = h[n]\cos\left[\frac{\pi}{32}\left(k+\frac{1}{2}\right)(n-16)\right], \quad (62)$$

$$f_k[n] = 32h[n]\cos\left[\frac{\pi}{32}\left(k+\frac{1}{2}\right)(n+16)\right], \quad (63)$$

for $0\le k\le 31$ and $0\le n\le 511$.

The coefficients h[n] of the impulse response of the prototype filter may be found in:

"*Introduction to Digital Audio and Standards*", M. Bosi, R. E. Goldberg, pp 92-93, Kluwer Academic Publishers (2002).

The values provided in the MPEG-1. Audio Layer I-II standard correspond to the window $(-1)^l h(2lM+j)$, with $0\le j\le 2M-1$ and $0\le l\le m-1$.

Described below is an aspect of the invention according to which the conversion between sub-band domains would be combined with a filtering processing.

During a transcoding operation, it is possible to perform an intermediate processing on the decoded signal before recoding it in the new format. Several cases of multimedia signal processing (audio, image and video) are based on linear filtering. The following examples may be cited:

Image or video filtering for resampling (switching from a CIF to the QCIF format).

Audio filtering by HRTF filters ("Head Related Transfer Functions") for sound spatialization. This is one of the interesting cases of combining transcoding and spatialization. A possible application would typically be processing in teleconferencing audio bridges.

With respect to the block diagram of FIG. 5*a*, here a filter S(z) is introduced between the two synthesis and analysis filter banks and a system equivalent thereto is found. The block diagrams are represented in FIGS. 20*a* and 20*b*.

The conversion system combined with filtering may be modeled by one and the same type of scheme as that represented in FIG. 5*b*. It is however characterized by the new filter matrix $\tilde{T}(z)$ defined by:

$$\tilde{T}(z)=[v(z)\otimes\tilde{g}(z)]|_{\downarrow K}, \quad (64)$$

where $\tilde{g}(z)$ is the matrix of size M×L whose elements are given by:

$$\tilde{G}_{nk}(z)=H_n(z)S(z)F_k(z),\ 0\le n\le M-1,\ 0\le k\le L-1. \quad (65)$$

In the expression (64) above, the matrix v(z) corresponds to the definition of formula (17). More explicitly, formula (64) may then be written:

$$\tilde{T}(z) = [[z^{M-1}z^{iM-jL}\tilde{g}(z)]|_{\downarrow K}]_{\substack{0\le i\le p_1-1, \\ 0\le j\le p_2-1}}, \quad (66)$$

A conversion between sub-band domains combined with a change of sampling frequency will now be described.

We consider here the case where a change of sampling frequency is performed on the synthesized temporal signal before being re-analyzed by the second analysis bank. The system within the meaning of the invention therefore combines conversion between sub-band domains and change of sampling frequency, as illustrated in FIGS. 21*a* and 21*b*.

In FIG. 21*a* is considered a system for changing sampling frequency by a rational factor $$\frac{Q}{R},$$

where Q and R are natural integers assumed to be relatively prime, hence such that gcd(Q,R)=1, without loss of generality.

In this system, the filter $S_{PB}(z)$ is a low-pass filter with normalized cut-off frequency $f_c=\min(\pi/Q,\pi/R)$ and with passband gain Q.

Here we define K' as the least common multiple of QL and RM (K'=1 cm(QL,RM)) and $q_1$, $q_2$ the two natural integers such that:

$$K'=q_1RM \text{ and } K'=q_2QL. \quad (67)$$

It will be noted that $q_1$ and $q_2$ are relatively prime.

In this case we consider the vector $\hat{U}(z)=[\hat{X}_0^T(z), \hat{X}_1^T(z), \ldots \hat{X}_{q_2-1}^T(z)]^T$ resulting from the decomposition of the signals vector X(z) into $q_2$ polyphase components, and the vector $\hat{V}(z)=[\hat{Y}_0^T(z), \hat{Y}_1^T(z), \ldots \hat{Y}_{q_1-1}^T(z)]^T$ resulting from the decomposition of the signals vector Y(z) into $q_1$ polyphase components.

The conversion system combined with the change of sampling frequency may be modeled by the diagram of FIG. 22. It is characterized by the filter matrix $\hat{T}(z)$ of size $q_1M \times q_2L$, defined as follows:

$$\hat{T}(z)=[\hat{v}(z) \otimes \hat{g}(z)]|_{\downarrow K'}, \quad (68)$$

where $\hat{g}(z)$ is the matrix of size M×L whose elements are given by:

$$\hat{G}_{nk}(z)=H_n(z^R)S_{PB}(z)F_k(z^Q),\ 0 \le n \le M-1,\ 0 \le k \le L-1, \quad (69)$$

and $\hat{v}(z)$ is the matrix whose elements are defined as follows:

$$\hat{v}_{ij}(z)=z^{iRM-jQL},\ 0 \le i \le q_1-1,\ 0 \le j \le q_2-1. \quad (70)$$

while also complying with the following relation:

$$\hat{V}(z)=\hat{T}(z)\hat{U}(z). \quad (71)$$

According to formula (69), $\hat{G}_{nk}(z)$ is interpreted as the result of the convolution of the filter $H_n(z)$ oversampled by a factor R, of the filter $S_{PB}(z)$ and of the filter $F_k(z)$ oversampled by a factor Q.

To reduce the delay of the global system, it is possible to choose the matrix $\hat{v}(z)$ whose elements are defined as follows:

$$\hat{v}_{ij}(z)=z^{C_{max}+iRM-jQL},\ 0 \le i \le q_1-1,\ 0 \le j \le q_2-1 \quad (72)$$

where $c_{max}$=max {n∈N such that h≤RM−1 and n is divisible by gcd (L,R)}.

The same interpretation can be given to the formulation of the matrix $\hat{T}(z)$ as that given above. Thus, the filters $\hat{T}_{ml}(z)$, with $0 \le m \le q_1M-1$ and $0 \le l \le q_2L-1$, the elements of this matrix, may be written as follows:

$$\hat{T}_{ml}(z) = \begin{cases} \hat{G}_{nk}^{e'_{ij}}(z), \text{ if } 0 \le e'_{ij} \le K'-1, \\ z^{-1}\hat{G}_{nk}^{K'+e'_{ij}}(z), \text{ if } e'_{ij} < 0, \end{cases} \quad (73)$$

for $0 \le m \le q_1M-1$ and $0 \le l \le q_2L-1$, and where $e'_{ij}=c_{max}+iRM-jQL$. The integers i, n and j, k are obtained directly from l and from m by:

$$i = \left\lfloor \frac{m}{M} \right\rfloor \text{ and } n = m - iM, \quad (74)$$

$$j = \left\lfloor \frac{l}{L} \right\rfloor \text{ and } k = l - jL, \quad (75)$$

The same developments and explanations given for the system for converting between sub-band domains remain valid for this new combined system on replacing the matrix T(z) by $\hat{T}(z)$ and on taking account of the parameters which characterize it. The system then takes the form of a linear periodically time varying system (LPTV). The preferred process of implementation described above and the simplification of the system in certain particular cases may be envisaged in this application also. It will however be noted that the particular cases to be distinguished in the present system relate to the case where RM and QL are multiples of one another.

Figure 23:
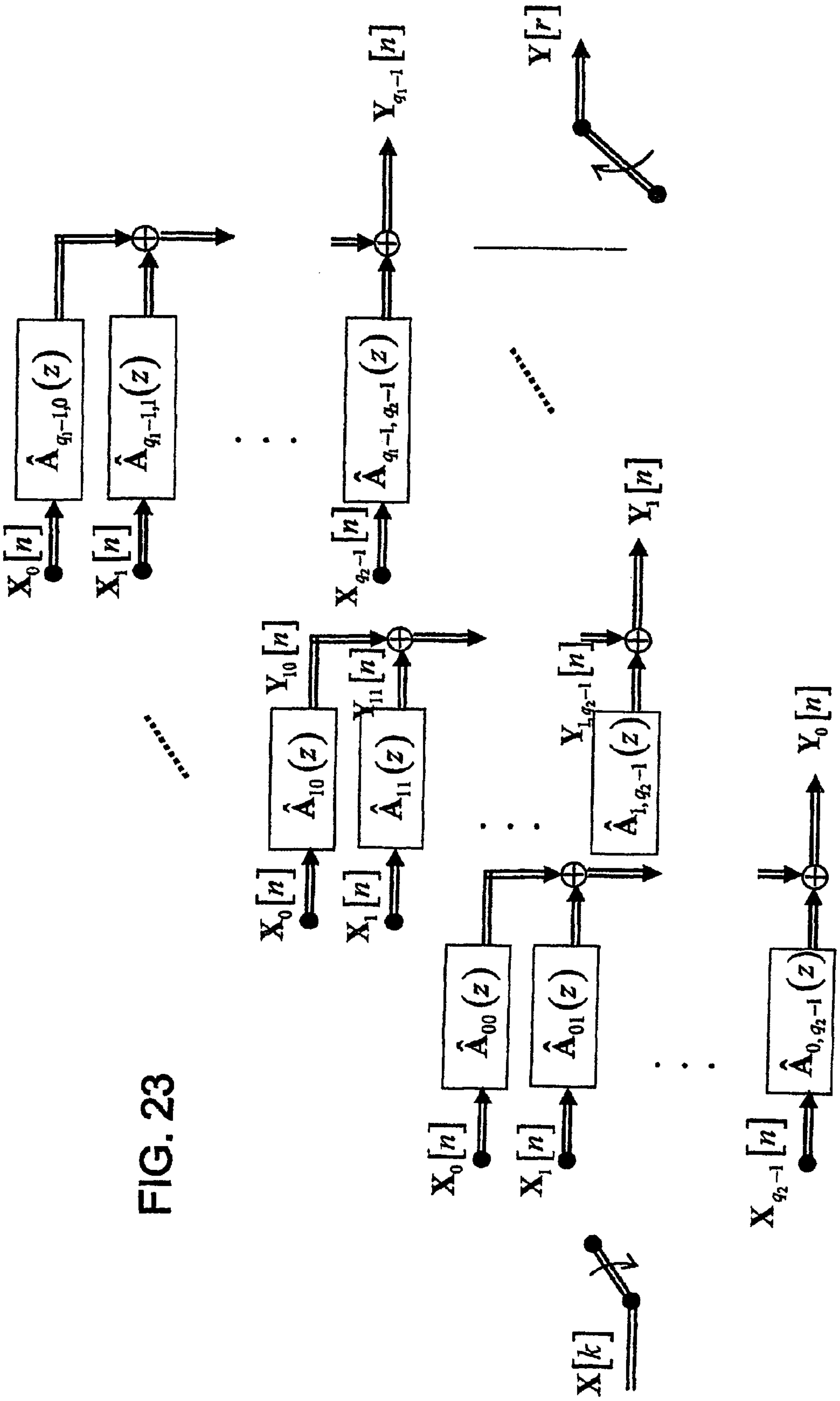
FIG. 23 represents the system within the meaning of the invention in the guise of LPTV system applied to a conversion combined with a re-sampling.

In this case, the system according to FIG. 23 operates with the matrices $\hat{A}_{ij}(z)$ such that:

$$\hat{A}_{ij}(z)=[z^{c_{max}}z^{iRM-jQL}\hat{g}(z)]|_{\downarrow K'},\ 0 \le i \le q_1-1 \text{ and } 0 \le j \le q_2-1. \quad (76)$$

Figure 24:
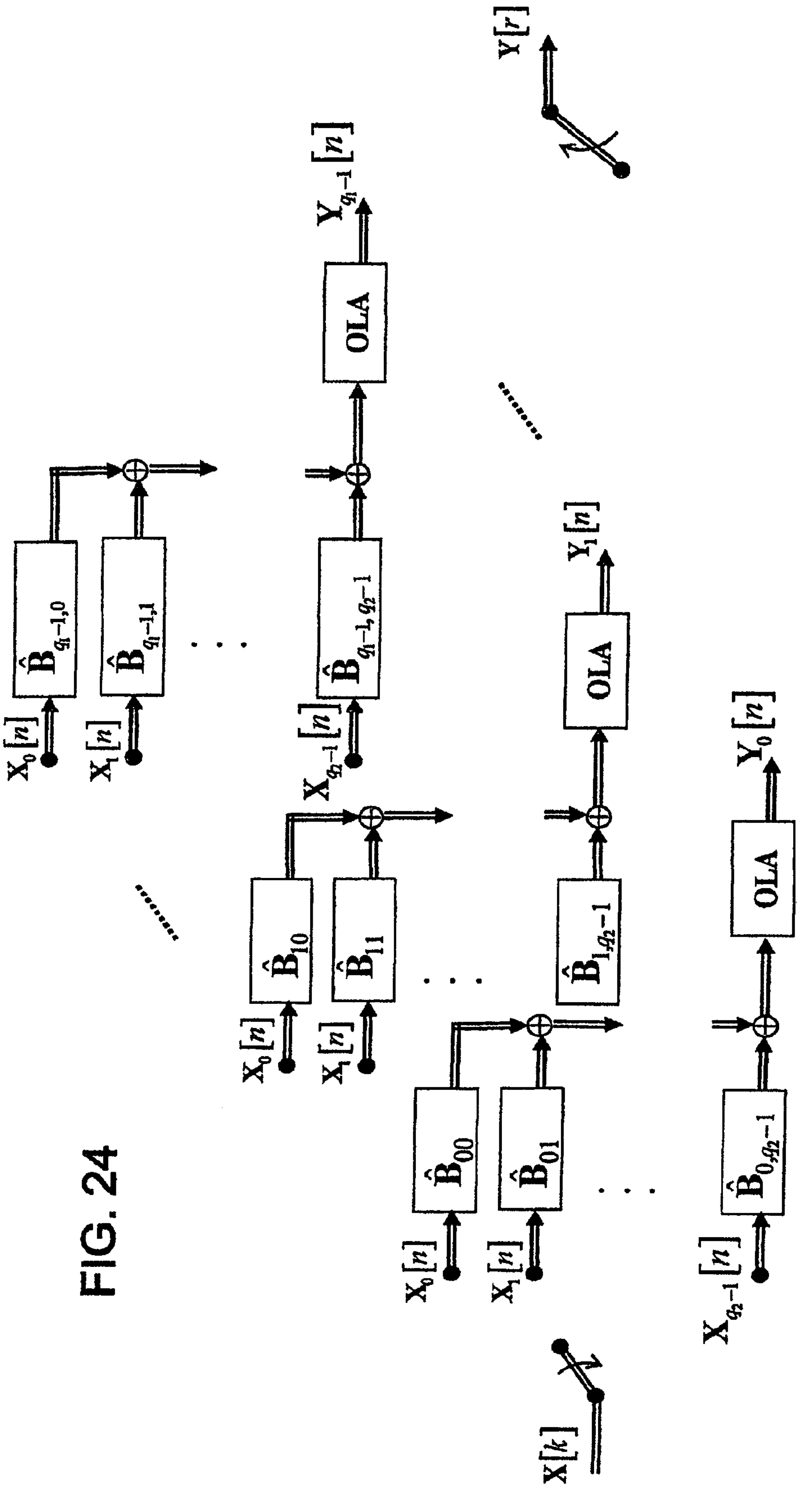
FIG. 24 represents a preferred embodiment corresponding to a transform and an addition with overlap OLA for efficient implementation allowing processing on the fly of the conversion system of FIG. 23.

In the case of an implementation using an overlap transform, preferably under the assumption that the synthesis and analysis filter banks, as well as the low-pass filter used for re-sampling, have finite impulse responses, so that:

$$\hat{A}_{ij}(z) = \sum_{n=0}^{N'-1} \hat{B}_{ij,n} z^{-n},$$

where the matrices $\hat{B}_{ij,n}$ are of size M×L, the following definition of the matrices $\hat{B}_{ij}$ such as represented in FIG. 24 may be given as follows:

$$\hat{B}_{ij}=[\hat{B}_{ij,0}{}^T\hat{B}_{ij,1}{}^T \ldots \hat{B}_{ij,N'-1}{}^T]^T,\ 0 \le i \le q_1-1 \text{ and } 0 \le j \le q_2-1. \quad (77)$$

In general, it will be understood that the present invention gives a generic solution for converting a representation of a signal from one sub-band domain (or transform) to another. The method is preferentially applied in the context where the filter banks used by the two compression systems are of maximal decimation type, as was seen above.

Although the detailed description above is essentially of interest in audio coding, the embodiments described may be envisaged for all sub-band or transform-based coders of multimedia signals, in particular those used in video, image, speech coding, or the like. These embodiments may also be implemented in any device exhibiting a cascade of a synthesis bank and of an analysis bank, in particular in the following examples:

- Improvement in the quality of sub-band speech followed by sub-band echo cancellation and vice versa.
- Echo cancellation or sub-band noise suppression algorithm followed by a sub-band coder.
- Sub-band decoder followed by echo cancellation or sub-band suppression algorithm.
- Process for reconstructing the high frequency band in audio by a process such as SBR (standing for "Spectral Band Replication") since this process implements an analysis bank and its input is the output from an audio decoder.

It will thus be understood that the application of the invention is in no way limited to a simple transcoding between two different coding formats.

Nevertheless, a few applications to audio transcoding will be described below.

Transcoding between audio coding formats is growing in importance having regard to the current diversity of existing terminals and transport and access networks.

According to the service and the delivery scenario for the audio content, the transcoding may intervene at various points in the transmission chain. In what follows, a few possible cases are distinguished.

Figure 25:
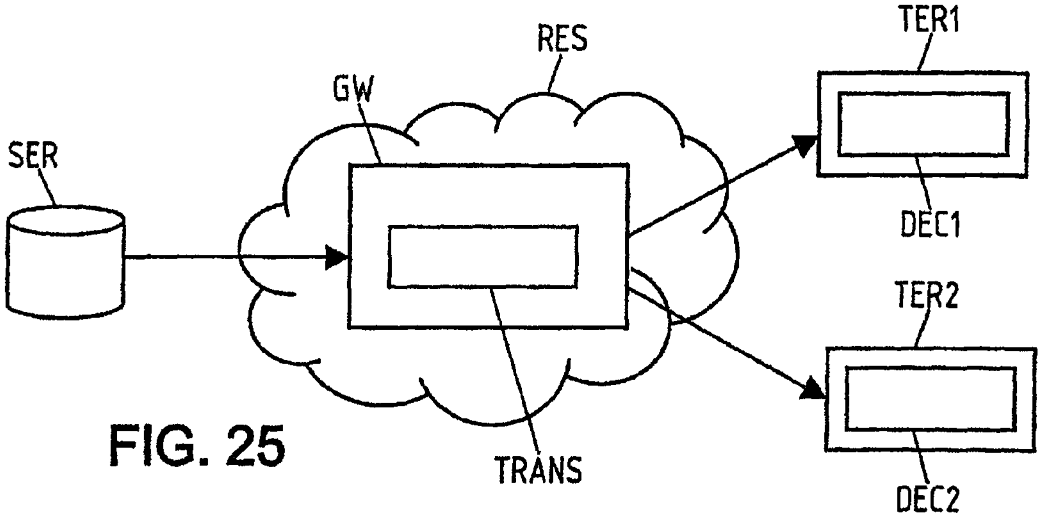
FIG. 25 represents a transcoding intervening in a gateway GW of a communication network, for a possible application of the present invention.

Broadcasting relates to digital broadcasting systems which use various types of audio coders. Thus, in Europe (DVB standard), MPEG-2 BC audio Layer II coders are indicated. On the other hand, in the USA, the Dolby AC-3 coder is advocated. In Japan, the MPEG-2 AAC coder is chosen. The transcoding mechanism TRANS is advantageous in a gateway GW in the network RES for transmitting audio content arising from a server SER and destined for a first terminal TER1, equipped with a decoder DEC1 and another terminal TER2, equipped with another decoder DEC2, as represented in FIG. 25.

In so-called multicast streaming applications, a single content is preferentially transmitted to several terminals TER1, TER2, for reasons of bandwidth optimization in the transport network RES. Personal adaptation is done at the level of the last node of the network for each end user. These users may have terminals supporting different decoders, hence the usefulness of transcoding in the node of the network, as represented in the previous FIG. 25.

Figure 26:
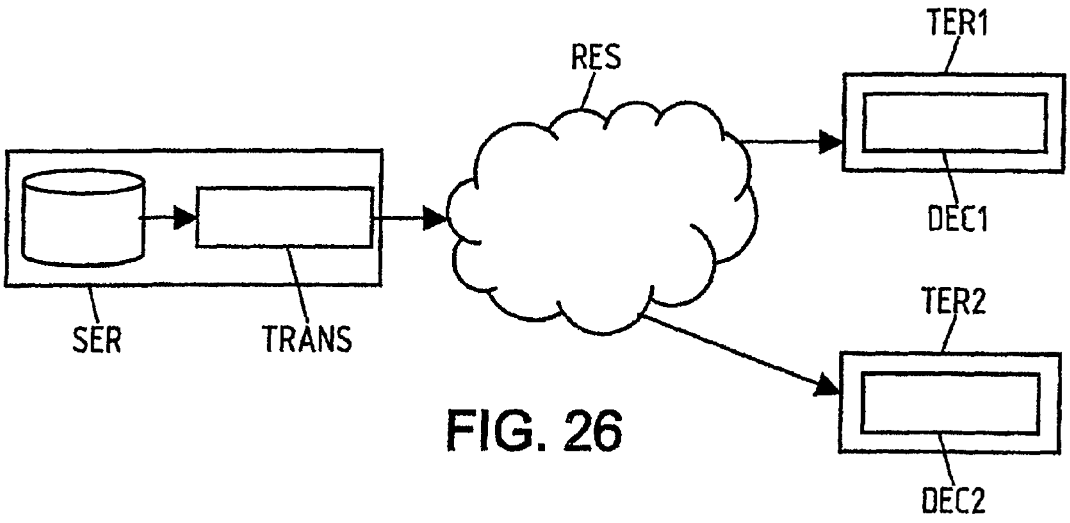
FIG. 26 represents a transcoding intervening directly at a server SER.

In the case of unicast streaming, the transcoding TRANS (FIG. 26) may be done at the server SER to adapt the content to the capacities of the terminals TER1, TER2. The information regarding the capacity of the terminals has been previously received and analyzed by the server SER.

In "download" mode, the audio content is stored in a given coding format. It is transcoded in real time so as to be compatible with the terminal on each request of a user before being downloaded.

In group communication (teleconferencing, audioconferencing, or the like), the terminals involved may have different capacities in terms of coders/decoders. In a centralized teleconferencing architecture, implementing an audio bridge, a transcoding may intervene at the bridge level.

Table 3 below now indicates a few possible, advantageous, transcodings between audio coding formats according to the fields of application.

TABLE 3

Examples of certain types of interesting transcodings and their fields of application.

| | MPEG-1/2 LII | MPEG-2/4 AAC | Dolby AC-3 | MSAudio | G.722 | G.722.1 | MPEG-1/2 LIII | France Telecom TDAC |
|---|---|---|---|---|---|---|---|---|
| MPEG-1/2 LII | | Broadcasting | Broadcasting | | | | | |
| MPEG-2/4 AAC | Broadcasting Switch between DVB and IP | | Broadcasting | | | | | |
| Dolby AC3 | Broadcasting | Broadcasting | | | | | | |
| MSAudio | | | | | | | | |
| G.722 | | | | | | | | Teleconferencing |
| G.722.1 | | | | | | | | Teleconferencing |
| MPEG-1/2 LIII | | | | | | | | |
| France Telecom TDAC | | | | | | | | |

FIG. 27 then indicates the parameters of the conversion system within the meaning of the invention for these particular cases of coding formats.

The invention claimed is:

1. A method implemented in a conversion system, comprising an input block, an output block and a module, the method comprising:

converting a first representation of a signal from one sub-band domain to another sub-band domain, said first representation of the signal in the sub-band domain being in the form of a first vector, by compacting in one and the same processing the application of the first vector comprising a first number L of respective sub-band components to a bank of synthesis filters, then to a bank of analysis filters, to obtain a second vector comprising a second number of respective sub-band components M, wherein converting the first representation of the signal from the one sub-band domain to another sub-band domain comprises the following steps, after determination of a third number K, the least common multiple between the first number L and the second number M:

a) if the third number K is different from the first number L, arrangement blockwise by a serial/parallel conversion of the input block of the first vector to obtain $p_2$ polyphase component vectors, with $p_2$=K/L, and skip to step b) without performing said arrangement blockwise by a serial/parallel conversion if the third number K is equal to the first number L, b) application by the module of a chosen matrix filtering, involving a square matrix T(z) of dimensions K×K, to said $p_2$ polyphase component vectors to obtain $p_i$ polyphase component vectors of the second vector, with $p_1$=K/M, and c) if the third number K is different from the second number M, arrangement blockwise by a parallel/serial conversion of the output block of the $p_1$ polyphase component vectors of the second vector to obtain said second vector, said arrangement blockwise by a parallel/serial conversion being not performed if the third number K is equal to the second number M; and wherein the converting is performed in a computer comprising a non-transitory computer readable medium comprising executable instructions for performing the converting.

2. The method as claimed in claim 1, wherein the serial/parallel conversion of step a) corresponds to the application, to the first vector, of an advance $z^{p_2-1}$, followed by a chain of delays with subsampling by a factor $p_2$, to obtain said $p_2$ polyphase component vectors, corresponding to a decomposition of the order $p_2$ of the first vector.

3. The method as claimed in claim 1 wherein the parallel/serial conversion of step c) comprises an oversampling by a factor $p_1$ applied to the $p_1$ polyphase component vectors, corresponding to a decomposition of the order $p_1$, said components being intended to form the second vector.

4. The method as claimed in claim 1, wherein said square matrix T(z) results from a decimation by a factor K applied to a matrix formed of $p_1 \times p_2$ submatrices each expressed by $z^{iM-jL}g(z)$, where:

$z^x$ denotes an advance or a delay, depending on the sign of x, i lies between 0 and $p_1-1$, j lies between 0 and $p_2-1$ and g(z) is a matrix of dimensions M×L resulting from the product $h(z).f^T(z)$, where h(z) and f(z) are the vectors of the transfer functions respectively associated with the banks of analysis and synthesis filters, the notation $M^T$ denoting the transpose of the matrix M.

5. The method as claimed in claim 4, in which the filters of the analysis and synthesis banks are of modulated cosine and finite impulse response type, and wherein the analysis and/or synthesis filters are obtained by a cosine modulation of a low-pass prototype filter H(z), so that the impulse responses of the analysis and/or synthesis filters, forming the vectors of the transfer functions h(z) and/or f(z), respectively, are each expressed, for a bank of filters with M bands, by:

$$h_k[n] = h[n]\cos\left[\frac{\pi}{M}\left(k+\frac{1}{2}\right)\left(n-\frac{N-1}{2}\right)-\theta_k\right],$$

$$0 \le k \le M-1,$$

and/or $$f_k[n] = h[n]\cos\left[\frac{\pi}{M}\left(k+\frac{1}{2}\right)\left(n-\frac{N-1}{2}\right)+\theta_k\right],$$

$$0 \le k \le M-1,$$

where:

$$\theta_k = \frac{(2k+1)\Pi}{4},$$

h[n] is the impulse response of the prototype filter, of length N, n is such that $0 \le n \le N-1$.

6. The method as claimed in claim 4, wherein, if provision is moreover made for a resampling by a rational factor Q/R between the bank of synthesis filters and the bank of analysis filters, the filtering matrix $\hat{T}(z)$, of size $q_1M \times q_2L$, is defined by:

$$\hat{T}(z)=[\hat{v}(z) \otimes \hat{g}(z)]|_{\downarrow K'},$$

where:

$\hat{g}(z)$ is the matrix of size M×L whose elements are given by:

$$\hat{G}_{nk}(z)=H_n(z^R)S_{PB}(z)F_k(z^Q),\ 0 \le n \le M-1,\ 0 \le k \le L-1,$$

$\hat{v}(z)$ is the matrix whose elements are preferentially defined by:

$$\hat{V}_{ij}(Z)=z^{c_{max}iRM-jQL},\ 0 \le i \le q_1-1,\ 0 \le j \le q_2-1$$

with $c_{max}$=max {n∈N such that h≤RM−1 and n is divisible by gcd (L,R)}, and $S_{PB}(z)$ is preferentially a low-pass filter with cutout frequency $\tilde{f}_c$=min (π/Q,π/R) and with passband gain Q.

7. The method as claimed in claim 4, wherein an advance $z^{M-1}$ is moreover applied to all the $p_1 \times p_2$ submatrices, to obtain elements of said matrix T(z) each corresponding to a causal filter and together defining a conversion system with minimal algorithmic delay.

8. The method as claimed in claim 7, in which, between the bank of synthesis filters and the bank of analysis filters, there is provided moreover a supplementary filter S(z), wherein the elements of the matrix T(z) are expressed as a function of polyphase components to the order K of product filters $G_{nk}(z)$ given by $G_{nk}(z)=H_n(z)S(z)F_k(z)$, with:

n lying between 0 and M−1 and k lying between 0 and L−1, and $H_n(z)$ and $F_k(z)$, the $n^{th}$ and $k^{th}$ components of the vectors of the transfer functions respectively associated with the banks of analysis and synthesis filters.

9. The method as claimed in claim 7, wherein said elements of the matrix T(z) are expressed as a function of polyphase components to the order K of product filters $G_{nk}(z)$ given by $G_{nk}(z)=H_n(z)F_k(z)$, with:

n lying between 0 and M−1 and k lying between 0 and L−1, and $H_n(z)$ and $F_k(z)$, the $n^{th}$ and $k^{th}$ components of the vectors of the transfer functions respectively associated with the banks of analysis and synthesis filters.

10. The method as claimed in claim 9 wherein the element filters $T_{ml}(z)$ of the matrix T(z) are expressed by:

$$T_{ml}(z) = \begin{cases} G_{nk}^{\varepsilon_{ij}}(z), & \text{if } 0 \le e_{ij} \le K-1, \\ z^{-1}G_{nk}^{K+e_{ij}}(z), & \text{if } e_{ij} < 0,\ , \end{cases}$$

with $$e_{ij} = (M-1) + (iM - jL),$$

and where:

in the notation $G_{nk}^{x}(z)$, x corresponds to a polyphase component number, resulting from a decomposition to the order K of the product filter $G_{nk}(z)$, i corresponds to the integer part of the ratio m/M, j corresponds to the integer part of the ratio l/L, the number n is given by n=m−iM, and the number k is given by k=l−jL.

11. The method as claimed in claim 10, wherein, if the second number M is a multiple of the first number L, the element filters $T_{ml}(z)$ of the matrix T(z) are expressed by $T_{ml}(z)=G_{mj}^{(p-k)L-1}(z)$, m and l lying between 0 and M−1, and where:

p=M/L, k is the integer part of l/L, and the number j is given by j=l−kL.

12. The method as claimed in claim 10, wherein, if the first number L is a multiple of the second number M, the element filters $T_{ml}(z)$ of the matrix T(z) are expressed by $T_{ml}(z)=G_{il}^{(k+1)M-1}(z)$, m and l lying between 0 and L−1, and where:

k is the integer part of m/M, and the number i is given by i=m−kM.

13. The method as claimed in claim 1, wherein the method further comprises:

applying a conversion system of linear periodically time varying type, and of period T defined by $T=K.T_s$, with $T_s=T_{s1}/L=T_{s2}/M$, where $T_{s1}$ and $T_{s2}$ are the respective sampling periods in the domains of the bank of synthesis filters and of the bank of analysis filters, under critical sampling.

14. The method as claimed in claim 13, wherein the method further comprises:

applying $p_1$ linear periodically time varying subsystems, each of period $p_2.T_{s1}$, and in periodically choosing the outputs of the successive subsystems, with a period $p_1.T_{s2}$.

15. The method as claimed in claim 14, wherein the bit rate at the input of the global conversion system is $1/T_{s1}$, while its output bit rate is $1/T_{s2}$, for processing input data on the fly.

16. The method as claimed in one of claims 10 and 14 wherein each subsystem, of index i lying between 0 and $P_1-1$, comprises $p_2$ transfer matrices $A_{ij}(z)$, with j lying between 0 and $p_2-1$, whose elements are filters $A_{ij,nk}(z)$, with n lying between 0 and M−1 and k lying between 0 and L−1, such that:

$$A_{ij,nk}(z)=G_{nk}^{e_{ij}}(z),\ \text{if } 0\le e_{ij}\le K-1,\ \text{and } A_{ij,nk}(z)=z^{-1}G_{nkhu\ K+e}^{ij}(z),\ \text{if } e_{ij}<0.$$

17. The method as claimed in claim 1, in which the filters of the synthesis and analysis banks have finite impulse responses, wherein said chosen matrix filtering is expressed by an overlap transform of matrix P, of dimensions NK×K and such that:

$$P=\begin{bmatrix} P_0 \\ P_1 \\ \vdots \\ P_{N-1} \end{bmatrix},$$

the submatrices $P_n$ being of dimensions K×K and satisfying, with the matrix T(z), the relation:

$$T(z)=\sum_{n=0}^{N-1} P_n z^{-n}$$

where N corresponds to the maximum of the lengths of the element filters of T(z).

18. The method as claimed in claim 17 wherein the method further comprises the following steps, for a conversion between sub-band domains:

construction of a vector U[n] on the basis of $p_2$ first successive vectors X[k], in the sub-band domain of the bank of synthesis filters, application to the vector U[n] of the transformed conversion matrix P, to obtain a vector W[n]=P.U[n], addition with overlap on N successive vectors W[n−N+1], W[n−N+2], . . . , W[n−1], W[n], to form a vector V[n], arrangement in series of successive sub-vectors of the vector V[n], these sub-vectors each being of dimension corresponding to the second number M, to form said second vector.

19. The method as claimed in claim 17, wherein the method further comprises the following steps:

application of a first vector x⌊k⌋, expressed in the sub-band domain of the bank of synthesis filters, to the subsystems comprising the transformed matrices $B_{ij}$, with i lying between 0 and $p_1-1$ and j such that j=k mod $p_2$, for each fixed i, ranging from 0 to $p_1-1$:

application of a transform, of matrix $B_{ij}$, to the vector X[k] for j=k mod $p_2$, each matrix $B_{ij}$ being expressed as follows:

$B_{ij}=[B_{ij,0}{}^T B_{ij,1}{}^T \ldots B_{ij,N-1}{}^T]^T$ where the elements $B_{ij,n}$ are such that:

$$A_{ij}(z)=\sum_{n=0}^{N-1} B_{ij,n} z^{-n}$$

and $$P_n=[B_{ij,n}]_{\substack{0\le i\le p_1-1,\\ 0\le j\le p_2-1}},$$

for any n lying between 0 and N−1, summation of all the vectors resulting from the transform for j=0, . . . , $p_2-1$, addition with overlap on the vectors resulting from the summation, to construct, at the output of the subsystem of index i, a vector $Y_i[n]$, obtaining of a vector Y[n], at the output of the global conversion system, corresponding to the vector $Y_i[n]$ of the subsystem of index i such that i=n mod $p_1$, the notation mod n denoting the modulo of the number n.

20. The method as claimed in claim 19, wherein the matrices $B_{ij}$ comprise zero blocks of dimensions L×M such that:

for $0\le e_{ij}\le K-1$, if $0\le e_{ij}\le r_0-1$ then:

$$B_{ij}=[B_{ij,0}{}^T B_{ij,1}{}^T \ldots B_{ij,N-3}{}^T B_{ij,N-2}{}^T 0_{L\times M}]^T$$

if $r_0\le e_{ij}\le K-1$ then:

$$B_{ij}=[B_{ij,0}{}^T B_{ij,1}{}^T \ldots B_{ij,N-3}{}^T 0_{L\times M} 0_{L\times M}]^T$$

for $e_{ij}<0$, if $0\le K+e_{ij}\le r_0-1$ then:

$$B_{ij}=[0_{L\times M} B_{ij,1}{}^T \ldots B_{ij,N-3}{}^T B_{ij,N-2}{}^T B_{ij,N-1}{}^T]^T$$

if $r_0\le K+e_{ij}\le K-1$ then:

$$B_{ij}=[0_{L\times M} B_{ij,1}{}^T \ldots B_{ij,N-3}{}^T B_{ij,N-2}{}^T 0_{L\times M}{}^T]^T$$

with:

$0_{L\times M}$ denoting a zero block of dimensions L×M, and $$N=\left\lfloor \frac{N_1+N_2-2}{K} \right\rfloor+2,$$

where:

$N_1$ and $N_2$ are the respective lengths of the filters of the synthesis bank and of the analysis bank, the notation mod n denoting the modulo of the number n, the notation ⌊x⌋ denoting the integer part of the real number x.

21. The method as claimed in claim 20, wherein, if the first number M is a multiple of the second number L such that M=pL, the matrices $A_{ij}$ become $$A_j(z)=\sum_{n=0}^{N-2} B_{j,n} z^{-n},$$

where:

$0\le j\le p-1$, and $B_j$ are the transform matrices which are expressed by:

$$B_j = \begin{cases} [B_{j,0}^T \ B_{j,1}^T \ \dots \ B_{j,N-3}^T \ 0_{LxM}]^T, & \text{if } 0 \le j \le j_0, \\ [B_{j,0}^T \ B_{j,1}^T \ \dots \ B_{j,N-3}^T \ B_{j,N-2}^T]^T, & \text{if } j_0+1 \le j \le p-1, \end{cases}$$

where $$j_0 = p - \left\lfloor \frac{r_0+1}{L} \right\rfloor,$$

the notation $\lfloor x \rfloor$ denoting the integer part of the real number x.

22. The method as claimed in claim 21, wherein the method further comprises the following steps:

application of a first vector X[k], expressed in the sub-band domain of the bank of synthesis filters, to a subsystem comprising the transformed matrix $B_j$ with j such that j=k mod p, summation of the vectors resulting from the application of the transformed matrices $B_j$, for any j such that 0≤j≤p−1, obtaining of the vector Y[n], at the output of the global conversion system, by addition with overlap on the vectors resulting from said summation, the notation $\text{mod}_n$ denoting the modulo of the number n.

23. The method as claimed in claim 20, wherein, if the second number L is a multiple of the first number M such that L=pM, the matrices $A_{ij}$ become $$A_i(z) = \sum_{n=0}^{N-2} B_{i,n} z^{-n},$$

where:

0≤i≤p−1, and $B_i$ are the transform matrices which are expressed by:

$$B_i = \begin{cases} [B_{i,0}^T \ B_{i,1}^T \ \dots \ B_{i,N-3}^T \ B_{i,N-2}^T]^T, & \text{if } 0 \le i \le i_0, \\ [B_{i,0}^T \ B_{i,1}^T \ \dots \ B_{i,N-3}^T \ 0_{LxM}]^T, & \text{if } i_0+1 \le i \le p-1, \end{cases}$$

where $$i_0 = \left\lfloor \frac{r_0}{M} \right\rfloor - 1,$$

the notation $\lfloor x \rfloor$ denoting the integer part of the real number x.

24. The method as claimed in claim 23, wherein the method further comprises the following steps:

application of a first vector X[k], expressed in the sub-band domain of the bank of synthesis filters, to a subsystem comprising the transfer matrix $A_i(z)$, with 0≤i≤p−1, for any i fixed such that 0≤i≤p−1, application of a transform, of matrix $B_i$ to the vector X[k], and addition with overlap to obtain an output vector $Y_i[n]$, obtaining of an output vector Y[n], of the global conversion system, corresponding to the vector $Y_i[n]$, with i such that i=n mod p, the notation modn denoting the modulo of the number n.

25. An application of the method as claimed in claim 1, further comprising the steps of:

transcoding of a first type of compression coding/decoding to at least one second type of compression coding/decoding, wherein transcoding includes in compacting in one and the same processing the following steps:

recovering data at least partially decoded according to said first type, in the form of a first vector comprising a first number L of respective sub-band components, applying the first vector to a bank of synthesis filters according to the first type, then to a bank of analysis filters according to the second type, and recovering a second vector comprising a second number of respective sub-band components M and which can be applied to subsequent coding steps according to the second type.

26. An item of equipment such as a server, a gateway, or else a terminal in a communication network, wherein the item of equipment further comprises computer resources for the implementation of the method as claimed in claim 1.

27. A non-transitory computer-readable storage medium of an item of equipment in a communication network, such as a server, a gateway, or else a terminal, with an executable program stored thereon, wherein the executable program comprises instructions for the implementation of a method comprising:

converting a first representation of a signal from one sub-band domain to another sub-band domain, said first representation of the signal in the sub-band domain being in the form of a first vector, by compacting in one and the same processing the application of the first vector comprising a first number L of respective sub-band components to a bank of synthesis filters, then to a bank of analysis filters, to obtain a second vector comprising a second number of respective sub-band components M, wherein converting the first representation of the signal from the one sub-band domain to another sub-band domain comprises the following steps, after determination of a third number K, the least common multiple between the first number L and the second number M:

a) if the third number K is different from the first number L, arrangement blockwise by a serial/parallel conversion of the first vector to obtain $p_2$ polyphase component vectors, with $p_2$=K/L, and skip to step b) without performing said arrangement blockwise by a serial/parallel conversion if the third number K is equal to the first number L, b) application of a chosen matrix filtering, involving a square matrix T(z) of dimensions K×K, to said $p_2$ polyphase component vectors to obtain $p_1$, polyphase component vectors of the second vector, with $p_1$=K/M and c) if the third number K is different from the second number M, arrangement blockwise by a parallel/serial conversion of the $p_1$ polyphase component vectors of the second vector to obtain said second vector, said arrangement blockwise by a parallel/serial conversion being not performed if the third number K is equal to the second number M.

* * * * *

UNITED STATES PATENT AND TRADEMARK OFFICE

CERTIFICATE OF CORRECTION

PATENT NO. : 8,639,735 B2
APPLICATION NO. : 11/662980
DATED : January 28, 2014
INVENTOR(S) : Abdellatif Benjelloun Touimi It is certified that error appears in the above-identified patent and that said Letters Patent is hereby corrected as shown below:

On the Title Page (item 57, Abstract) line 7, Change “blocs,” to --blocks,--.

On the Title Page (item 57, Abstract) line 8, Change “to,” to --to--.

On the Title Page (item 57, Abstract) line 9, Change “(p2=KL);” to --($p_2$=KL);--.

In the Specification

In column 2 line 55, Change “wide,” to --wide--.

In column 3 line 57, TABLE 1, Change “(Kaise-Bessel” to --(Kaiser-Bessel--.

In column 3 line 60, TABLE 1, Change “long,” to --long--.

In column 4 line 32, TABLE 2, Change “broadcasting,” to --broadcasting--.

In column 10 line 1, Change “converting,” to --converting--.

In column 11 line 41, Change “v[k],” to --V[k],--.

In column 12 line 40, Change “(8)” to --(15)--.

In the Claims

In column 26 line 25, In Claim 1, change “$p_i$” to --$p_1$--.

In column 27 line 58, In Claim 6, change “ $\hat{T}(z)=[\hat{v}(z) \otimes \hat{g}(z)]|_{\downarrow K'}$, ” to -- $\hat{\mathbf{T}}(z)=\left[\hat{\mathbf{v}}(z)\otimes\hat{\mathbf{g}}(z)\right]_{\downarrow K'}$, --.

In column 28 lines 21-22, In Claim 16, change “ $A_{ij,nk}(z)=G_{nk}^{eij}(z)$, if $0 \le e_{ij} \le K-1$, and $A_{ij,nk}(z)=z^{-1}G_{nkhu\ K+e}^{ij}(z)$, if $e_{ij}<0$ ” to -- $A_{ij,nk}(z)=G_{nk}^{e_{ij}}(z)$, if $0 \le e_{ij} \le K-1$, and $A_{ij,nk}(z)=z^{-1}G_{nk}^{K+e_{ij}}(z)$, if $e_{ij}<0$ --.

Signed and Sealed this
Fifth Day of August, 2014

Michelle K. Lee

Michelle K. Lee
*Deputy Director of the United States Patent and Trademark Office*